US012595612B2

(12) United States Patent
Cagliani et al.

(10) Patent No.: US 12,595,612 B2
(45) Date of Patent: Apr. 7, 2026

(54) APPLIANCE SANITIZATION SYSTEM THAT UTILIZES OZONE GAS

(71) Applicant: WHIRLPOOL CORPORATION, Benton Harbor, MI (US)

(72) Inventors: Marco Cagliani, Fabriano (IT); Karl David McAllister, Stevensville, MI (US); Omar R. Murad, Rio Claro (BR); Sadasivam Narayanan, Pondicherry (IN); Nicholas B. Vaive, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 547 days.

(21) Appl. No.: 17/989,119

(22) Filed: Nov. 17, 2022

(65) Prior Publication Data

US 2023/0183907 A1     Jun. 15, 2023

Related U.S. Application Data

(60) Provisional application No. 63/288,667, filed on Dec. 13, 2021.

(51) Int. Cl.
    *D06F 35/00*     (2006.01)
    *C01B 13/10*     (2006.01)
    *D06F 34/14*     (2020.01)
(52) U.S. Cl.
    CPC ............ *D06F 35/001* (2013.01); *C01B 13/10* (2013.01); *D06F 34/14* (2020.02)
(58) Field of Classification Search
    CPC ......... D06F 25/00; D06F 33/34; D06F 33/37;

D06F 33/43; D06F 33/54; D06F 33/57; D06F 33/63; D06F 33/64; D06F 33/69; D06F 34/14; D06F 34/26; D06F 34/28; D06F 34/30; D06F 34/32; D06F 35/001; D06F 35/008; D06F 39/02; D06F 39/022; D06F 39/08; D06F 39/083; D06F 2101/00; D06F 2101/20
See application file for complete search history.

(56) References Cited

U.S. PATENT DOCUMENTS

| | | | |
|---|---|---|---|
| 1,948,239 A | 2/1934 | Redd | |
| 4,182,050 A | 1/1980 | Righi | |
| | (Continued) | | |

FOREIGN PATENT DOCUMENTS

| | | |
|---|---|---|
| BE | 899577 A | 8/1984 |
| CN | 102933760 A | 2/2013 |
| | (Continued) | |

OTHER PUBLICATIONS

Batakliev et al., "Interdisciplinary Toxicology," Interdiscip Toxicol. 2014; vol. 7(2): 47-59. doi: 10.2478/intox-2014-0008 Feb. 23, 2014.

*Primary Examiner* — David G Cormier
(74) *Attorney, Agent, or Firm* — Price Heneveld LLP

(57) ABSTRACT

A laundry washing appliance includes a drum that is rotationally operable within a tub. A sanitization mechanism delivers ozone into a processing space defined within the drum for sanitizing laundry within the drum. An ozone generator of the sanitization mechanism generates ozone gas wherein the sanitization mechanism includes an injection device that injects the ozone into the drum during a specific rotational operation of the drum.

20 Claims, 21 Drawing Sheets

(56) References Cited

U.S. PATENT DOCUMENTS

| | | | |
|---|---|---|---|
| 5,181,399 A | 1/1993 | Engel et al. | |
| 5,625,915 A | 5/1997 | Radler et al. | |
| 5,653,129 A | 8/1997 | Jang | |
| 5,787,537 A | 8/1998 | Mannillo | |
| 5,806,120 A | 9/1998 | Mceachern | |
| 5,960,501 A | 10/1999 | Burdick | |
| 5,960,649 A | 10/1999 | Burdick | |
| 6,408,471 B1 | 6/2002 | Teran et al. | |
| 7,415,847 B1 | 8/2008 | Ho | |
| 7,430,884 B2 | 10/2008 | Laithwaite | |
| 7,681,411 B2 | 3/2010 | DiLorenzo | |
| 7,905,120 B2 | 3/2011 | Mamiya et al. | |
| 8,020,232 B2 | 9/2011 | Daniels et al. | |
| 8,394,349 B2 | 3/2013 | Eglmeier et al. | |
| 8,881,422 B2 | 11/2014 | Abramovich et al. | |
| 8,919,356 B2 | 12/2014 | Brockman et al. | |
| 8,984,914 B2 | 3/2015 | Daniels et al. | |
| 8,991,218 B2 | 3/2015 | Ulger et al. | |
| 9,067,807 B2 | 6/2015 | Soane et al. | |
| 9,085,842 B2 | 7/2015 | Ulger et al. | |
| 9,238,884 B2 | 1/2016 | Tobi et al. | |
| 9,493,896 B2 | 11/2016 | Allen et al. | |
| 9,657,423 B2 | 5/2017 | Daniels et al. | |
| 10,227,720 B2 | 3/2019 | Allen et al. | |
| 10,344,416 B2 | 7/2019 | Rupnow | |
| 10,633,777 B2 | 4/2020 | Skrippek et al. | |
| 10,676,854 B2 | 6/2020 | Daniels | |
| 10,801,151 B2 | 10/2020 | Rupnow | |
| 10,907,292 B2 | 2/2021 | Harbrecht et al. | |
| 2008/0236208 A1 | 10/2008 | Miyata et al. | |
| 2008/0282745 A1 | 11/2008 | Han et al. | |
| 2008/0302139 A1 | 12/2008 | Zorn | |
| 2009/0126420 A1 | 5/2009 | Tsunemine et al. | |
| 2009/0255299 A1 | 10/2009 | Hiro et al. | |
| 2009/0260404 A1 | 10/2009 | Saito et al. | |
| 2010/0107343 A1 | 5/2010 | Daniels et al. | |
| 2010/0263689 A1 | 10/2010 | Monsrud et al. | |
| 2011/0185516 A1 | 8/2011 | Zorn | |
| 2011/0226021 A1 | 9/2011 | Ulger et al. | |
| 2012/0017379 A1 | 1/2012 | Moore et al. | |
| 2014/0033445 A1* | 2/2014 | Daniels | D06F 33/30 |
| | | | 8/137 |
| 2014/0059881 A1 | 3/2014 | Kim et al. | |
| 2014/0325766 A1 | 11/2014 | Roetker | |
| 2015/0021166 A1 | 1/2015 | Scheer et al. | |
| 2015/0211166 A1 | 7/2015 | Roetker | |
| 2018/0010261 A1 | 1/2018 | Uemura et al. | |
| 2018/0100261 A1 | 4/2018 | Xu et al. | |
| 2018/0134994 A1 | 5/2018 | Steele et al. | |
| 2018/0148876 A1* | 5/2018 | Skrippek | D06F 58/203 |
| 2019/0234011 A1 | 8/2019 | Allen et al. | |
| 2019/0352830 A1 | 11/2019 | Rupnow | |
| 2020/0246763 A1 | 8/2020 | Uchiyama et al. | |
| 2020/0289693 A1 | 9/2020 | Yoon et al. | |
| 2020/0325623 A1 | 10/2020 | Longinotti-Buitoni et al. | |

FOREIGN PATENT DOCUMENTS

| | | | |
|---|---|---|---|
| CN | 104363813 | A | 2/2015 |
| CN | 103476982 | B | 8/2016 |
| CN | 106367918 | A | 2/2017 |
| CN | 106544811 | A | 3/2017 |
| CN | 206418307 | U | 8/2017 |
| CN | 108642799 | A | 10/2018 |
| CN | 107002336 | B | 4/2019 |
| CN | 106795681 | B | 2/2020 |
| CN | 107109752 | B | 2/2020 |
| CN | 110952260 | A | 4/2020 |
| CN | 111101330 | A | 5/2020 |
| CN | 111235827 | A | 6/2020 |
| CN | 111455614 | A | 7/2020 |
| CN | 109154121 | B | 12/2020 |
| EP | 0841427 | A1 | 11/1996 |
| EP | 1980660 | B1 | 12/2006 |
| EP | 3227486 | B1 | 9/2015 |
| EP | 2794979 | B1 | 10/2015 |
| EP | 3227487 | B1 | 11/2015 |
| EP | 3502334 | B1 | 11/2020 |
| GB | 699945 | | 11/1953 |
| IN | 201811044266 | A | 8/2020 |
| JP | 0751500 | A | 2/1995 |
| JP | 09290280 | A | 11/1997 |
| JP | 2006158586 | A | 6/2006 |
| JP | 2007195866 | A | 8/2007 |
| JP | 4619258 | B2 | 1/2011 |
| JP | 6277385 | B2 | 2/2018 |
| KR | 0127662 | Y1 | 12/1998 |
| KR | 200326169 | Y1 | 8/2003 |
| KR | 200347470 | Y1 | 4/2004 |
| MX | 2016015653 | A | 5/2018 |
| WO | 2000037732 | A1 | 6/2000 |
| WO | 2007043326 | A1 | 4/2007 |
| WO | 2007086221 | A1 | 8/2007 |
| WO | 2007099113 | A1 | 9/2007 |
| WO | 2007138757 | A1 | 12/2007 |
| WO | 2007143785 | A1 | 12/2007 |
| WO | 2008000813 | A1 | 1/2008 |
| WO | 2009081640 | A1 | 7/2009 |
| WO | 2010003944 | A1 | 1/2010 |
| WO | 2010052146 | A1 | 5/2010 |
| WO | 2012103006 | A2 | 8/2012 |
| WO | 2014104796 | A1 | 7/2014 |
| WO | 2015158154 | A1 | 10/2015 |
| WO | 2016079139 | A1 | 5/2016 |
| WO | 2016173406 | A1 | 11/2016 |
| WO | 2017196754 | A1 | 11/2017 |
| WO | 2017206938 | A1 | 12/2017 |
| WO | 2019106908 | A1 | 6/2019 |
| WO | 2020181242 | A1 | 9/2020 |
| WO | 2020198619 | A2 | 10/2020 |

* cited by examiner

O₃ from Ozonizer

APPLIANCE SANITIZATION SYSTEM THAT UTILIZES OZONE GAS

CROSS REFERENCE TO RELATED APPLICATION

This application claims the benefit under 35 U.S.C. § 119(e) to U.S. Provisional Patent Application No. 63/288,667, filed Dec. 13, 2021, entitled "APPLIANCE SANITIZATION SYSTEM THAT UTILIZES OZONE GAS," which is incorporated herein by reference in its entirety.

BACKGROUND OF THE DISCLOSURE

The present disclosure generally relates to appliances, and more specifically, to various aspects and configurations of appliances that utilize ozone gas for treating and sanitizing laundry and fluids within an appliance.

SUMMARY OF THE DISCLOSURE

According to one aspect of the present disclosure, a laundry washing appliance includes a drum that is rotationally operable within a tub. A sanitization mechanism delivers ozone into a processing space defined within the drum for sanitizing laundry within the drum. An ozone generator of the sanitization mechanism generates ozone gas. A fluid pump includes an impeller that rotates within a volute for delivering wash fluid to the processing space. A nozzle is coupled with the volute and the ozone generator that injects ozone gas onto the volute to be mixed with the wash fluid that is agitated to a turbulent state in the volute.

According to another aspect of the present disclosure, a laundry washing appliance includes a drum that is rotationally operable within a tub. A sanitization mechanism delivers ozone into a processing space defined within the drum for sanitizing laundry within the drum. An ozone generator of the sanitization mechanism generates ozone gas wherein the sanitization mechanism includes an injection device that injects the ozone, in the form of the ozone gas, into the drum during a specific rotational operation of the drum.

According to yet another aspect of the present disclosure, an appliance includes a housing, a tub that is positioned within the housing, a fluid inlet that receives water from a water source, and an ozone generator. The ozone generator is operable between an activated state and a deactivated state. The ozone generator produces ozone when in the activated state. The water received at the fluid inlet is exposed to the ozone produced by the ozone generator. A hardness of the water is decreased as a result of exposure to the ozone produced by the ozone generator.

These and other features, advantages, and objects of the present disclosure will be further understood and appreciated by those skilled in the art by reference to the following specification, claims, and appended drawings.

Figure 1:
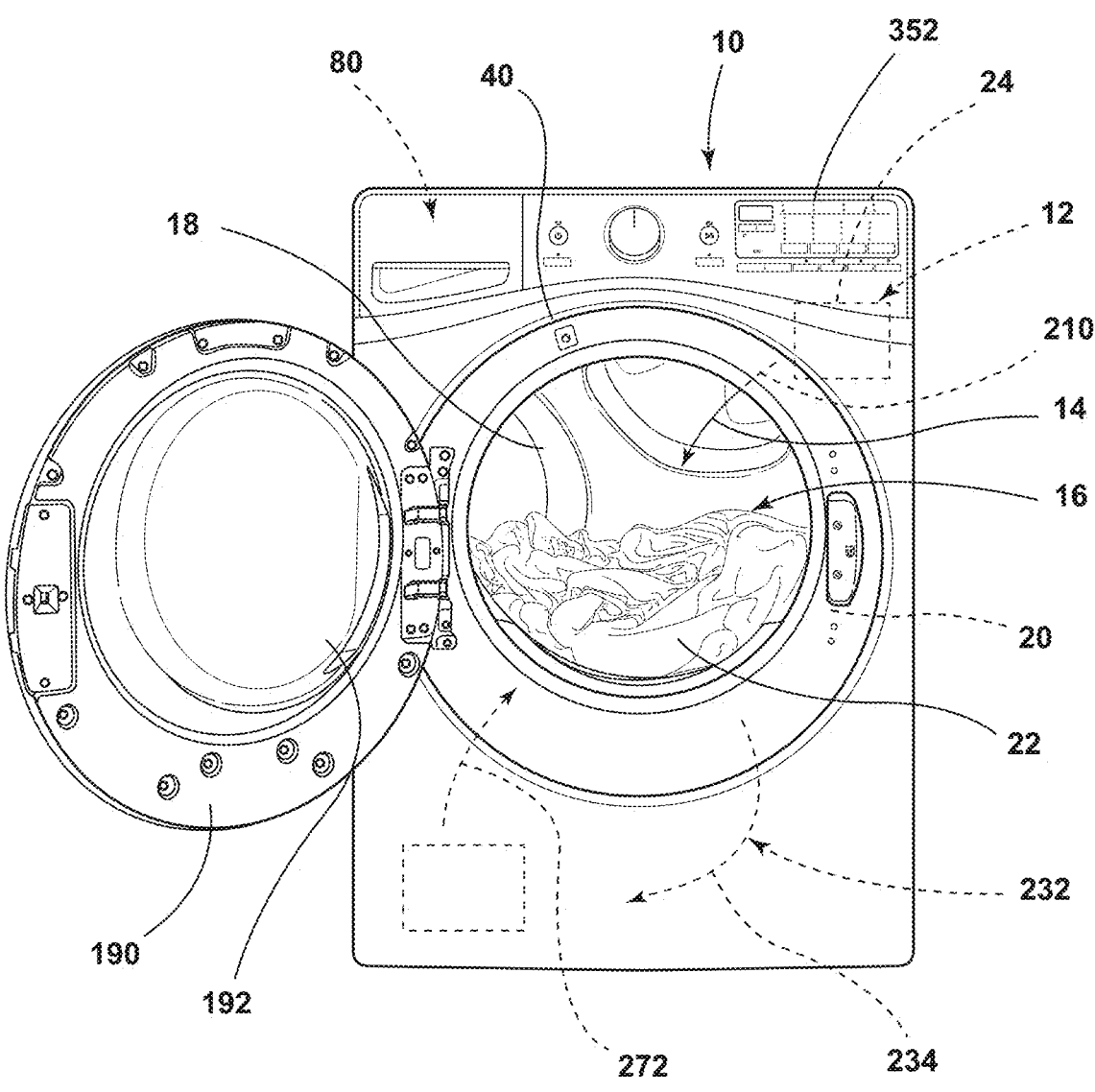
FIG. 1 is a front perspective view of a laundry appliance incorporating an aspect of a sanitization system.
Figure 2:
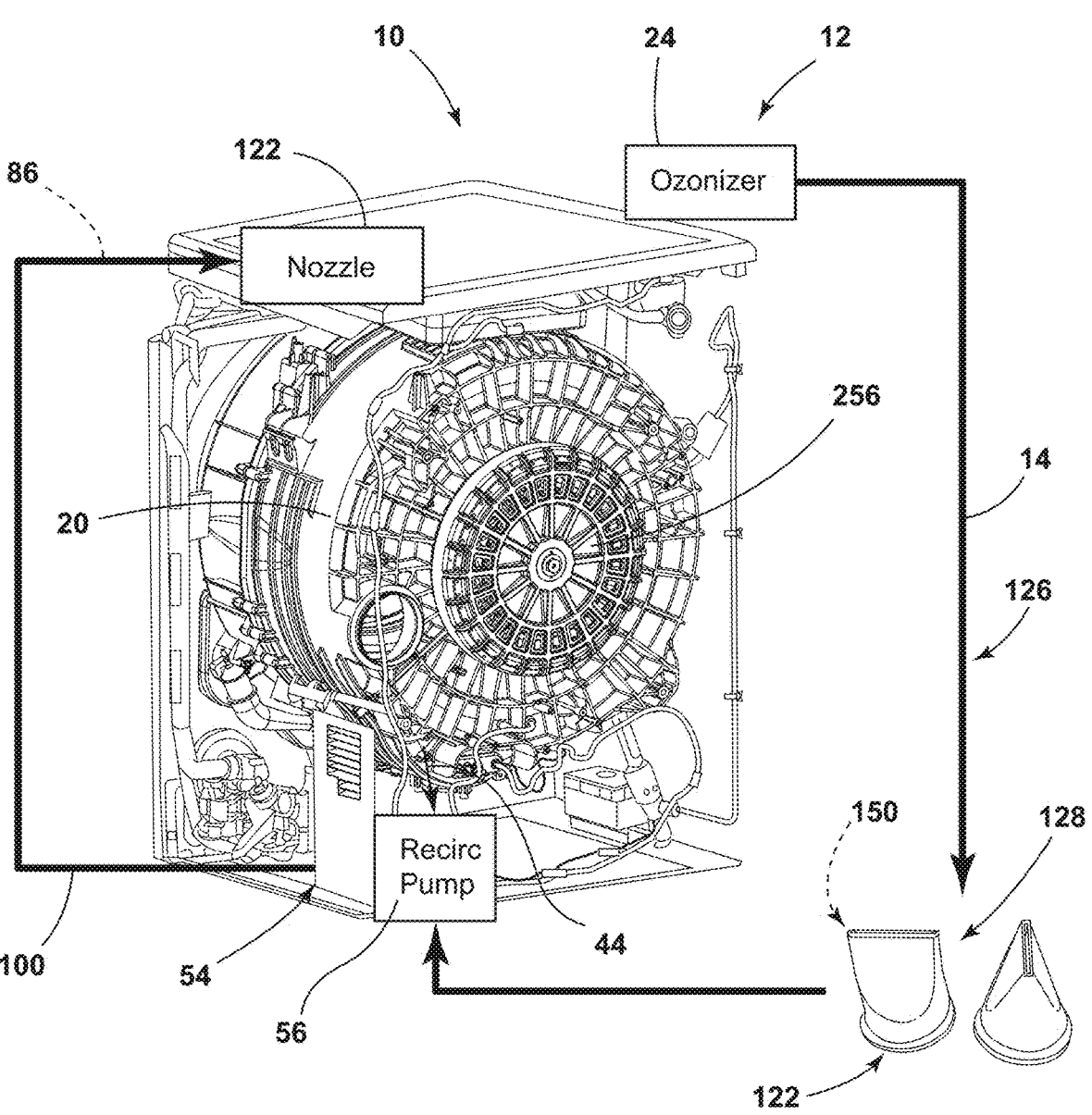
FIG. 2 is a schematic perspective view of a laundry appliance incorporated into a recirculation system.
Figure 3:
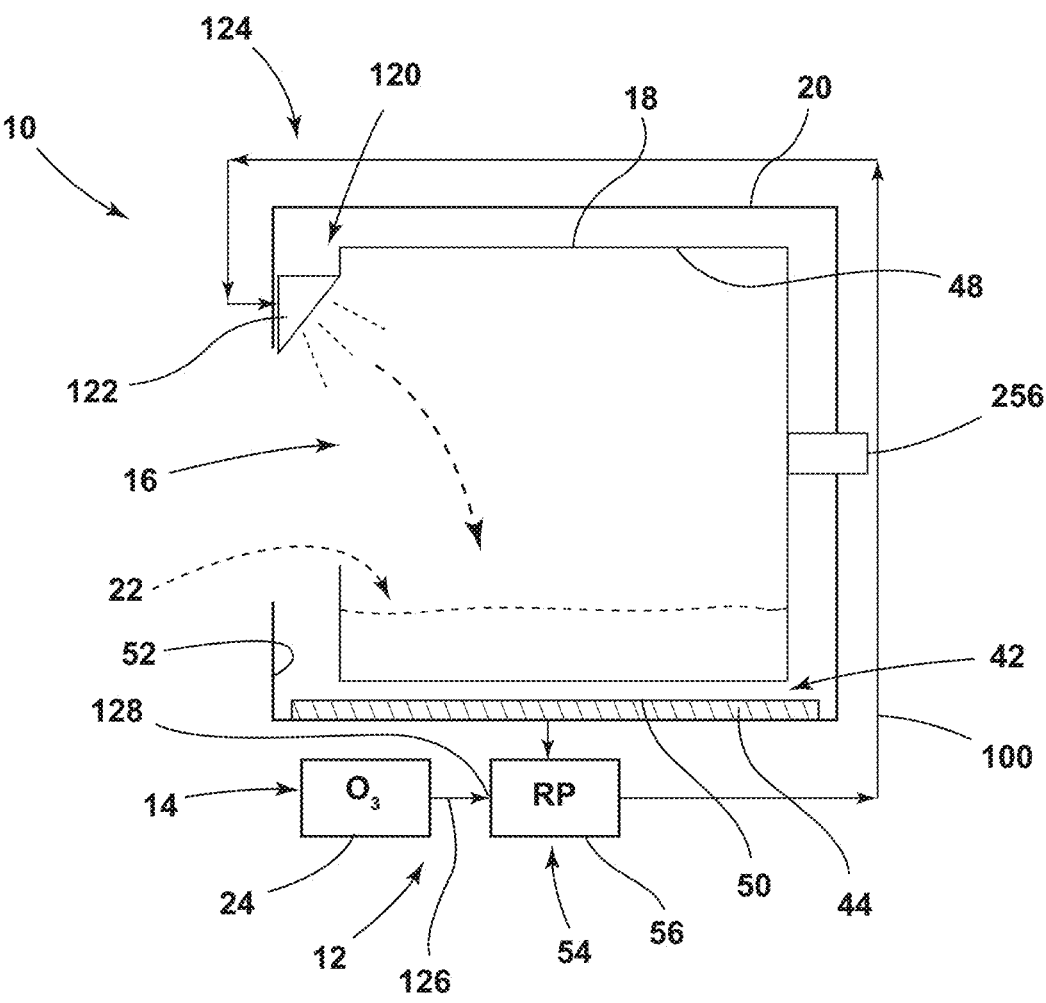
FIG. 3 is a schematic cross-sectional view of a laundry appliance incorporating aspects of a sanitization system.

The components in the figures are not necessarily to scale, emphasis instead being placed upon illustrating the principles described herein.

DETAILED DESCRIPTION

The present illustrated embodiments reside primarily in combinations of method steps and apparatus components related to a laundry appliance that includes a sanitization system for sanitizing laundry using ozone gas ($O_3$). Accordingly, the apparatus components and method steps have been represented, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-8, reference numeral 10 generally refers to an appliance that includes a sanitization mechanism 12 for delivering ozone gas 14 to a processing space 16 of the appliance 10. The processing space 16 is typically in the form of a drum 18 that rotates within the tub 20 to process articles 22. The appliance 10 can be a laundry appliance, such as a washer, dryer, combination washer and dryer, refreshing appliance, or other similar laundry appliance. The appliance 10 can also be a dishwasher or other cleaning appliance. The sanitization mechanism 12 includes an ozone generator 24, such as an ozonizer, that generates ozone gas 14 and delivers this ozone gas 14 for injection into the processing space 16. This injection can be via various ozone conduits 126, nozzles, and other similar pathways, as discussed herein.

The laundry appliance 10 includes a cabinet 40 that houses the tub 20 and the drum 18. Typically, there is an interstitial space 42 between the tub 20 and the drum 18 where fluid 44 can travel from a fluid source 46 and into the drum 18. The drum 18 typically includes a perforated wall 48 such that fluid 44 can travel through the perforated wall 48 of the drum 18 and collect within this interstitial space 42 between the tub 20 and the drum 18. Within the tub 20, the fluid 44 can collect within a sump 50 that is defined within the inside surface 52 of the tub 20, adjacent the perforated wall 48 of the drum 18. In certain aspects of the device, the sump 50 defined within the tub 20 can be in communication with a recirculation system 54 of the laundry appliance 10. This recirculation system 54 includes a recirculation pump 56 that receives fluid 44 from the sump 50 and directs this fluid 44 through various conduits for recirculation back into the drum 18.

The laundry appliance 10 also includes a dispenser 80 for dispensing various cleaning chemistry 82, such as detergent and other appliance-related consumables, into the processing space 16 for processing the articles 22. This cleaning chemistry 82 can be dispensed from the dispenser 80, typically in the form of a drawer, and into the processing space 16 in a direct manner. The cleaning chemistry 82 can also be dispensed into a mixing chamber 84 to be mixed with other fluid 44, such as a carrier fluid 86 to define a mixed fluid 88. This mixed fluid 88 can then be dispensed into the processing space 16 for processing articles 22.

Referring to FIGS. 1-6, the ozone generator 24 is included within the laundry appliance 10 for injecting ozone gas 14 into the drum 18 to sanitize the articles 22 being processed. The sanitization mechanism 12 can inject ozone into the tub 20 via various injection points 230 within and around the drum 18 and the tub 20. Each of these injection points 230 allows the articles 22 to be exposed to the ozone gas 14 from various directions and in various forms. This ozone gas 14 can be injected into the drum 18 as ozone gas 14 by itself, an ozone-containing fluid 100 or combinations of ozone gas 14 and ozone-containing fluid 100.

In aspects of the device wherein ozone-containing fluid 100 is injected into the drum 18, the ozone generator 24 can inject ozone gas 14 into the dispenser 80 containing the cleaning chemistry 82. The ozone gas 14 can also be injected into a mixing chamber 84 that mixes the cleaning chemistry 82 with the carrier fluid 86. In this manner, the ozone gas 14 can be mixed with the carrier fluid 86 and/or the mixed fluid 88. Where the ozone gas 14 is mixed with the carrier fluid 86, the ozone gas 14 is typically mixed in an area upstream or downstream of the dispenser 80. Where the ozone gas 14 is mixed with the mixed fluid 88, the ozone gas 14 is typically mixed within the mixing chamber 84 that is either within the dispenser 80 or downstream of the dispenser 80. After being mixed, this combination of fluids 44 and gasses forms one aspect of the ozone-containing fluid 100, which is then dispensed into the drum 18.

According to the various aspects, as exemplified in FIGS. 1-4, the ozone generator 24 can deliver the ozone gas 14 to the sump 50 to be mixed with the fluid 44 collected within the sump 50 and to be recirculated via the recirculation system 54 of the laundry appliance 10. Within the sump 50, the ozone gas 14 is injected into the fluid 44 and then delivered through the recirculation pump 56 and through the recirculation system 54 to be re-dispensed within the drum 18.

Referring again to FIGS. 1-6, the ozone gas 14, by itself or infused with one or more fluids 44, can be injected into the drum 18 through a bellows 120 and into the drum 18 to expose the articles 22 therein to the ozone gas 14, or the ozone-containing fluid 100. The bellows 120 is a flexible member that extends between the tub 20 and the cabinet 40. The bellows 120 allows the tub 20 to move and vibrate with respect to the cabinet 40, while maintaining the tub 20 as a generally fluid-tight container. In one aspect of the device, the ozone generator 24 is in communication with a fill nozzle 122, or fill port, that extends from the dispenser 80. This fill nozzle 122 is typically used for providing the carrier fluid 86, along with various cleaning chemistry 82, into the drum 18. The fill nozzle 122 can be in communication with a supply hose 124 that provides the carrier fluid 86, such as tap water, to the laundry appliance 10. To deliver the ozone gas 14 from the ozone generator 24, an ozone conduit 126 extends between the ozone generator 24 and the fill nozzle 122. An ozone valve, which is typically in the form of a one-way valve 128, controls the flow of ozone gas 14 into the fill nozzle 122. This one-way valve 128 can be in the form of a duckbill valve or other similar one-way valve 128.

During operation of the laundry appliance 10, when the ozone generator 24 is activated, ozone gas 14 is delivered through the one-way valve 128. The one-way valve 128 can be actively operated (opened and closed) by a controller 352, or can be passively operated through the fluid pressure of the ozone gas 14. In either instance, the one-way valve 128 moves to an open state 150 and allows the ozone gas 14 to flow through the one-way valve 128 and into the fill nozzle 122. From the fill nozzle 122, the ozone-containing fluid 100 having the carrier fluid 86 containing ozone gas 14 is then delivered through a dedicated tube for delivery into the drum 18. In this aspect of the device, it is typical that the ozone gas 14 does not pass through the dispenser 80, but rather intermixes with the carrier fluid 86 downstream of the dispenser 80. Accordingly, the ozone gas 14 can be mixed with the cleaning chemistry 82 in a diluted form as a mixture of the chemistry 82 and the carrier fluid 86.

In certain aspects of the device, the ozone generator 24 is activated when the carrier fluid 86 is not being provided to the drum 18 by the supply hose 124. This configuration allows the ozone gas 14 to travel through an injecting tube 170 to be injected directly into the drum 18. According to these aspects of the device, the injecting tube 170 extending from the fill nozzle 122 and to the drum 18 is coupled with a portion of the bellows 120. In this manner, ozone gas 14 by itself, or mixed with the carrier fluid 86, can be delivered through the bellows 120 and into the drum 18 to allow for more complete saturation and sanitization of the articles 22 within the drum 18.

Referring again to FIGS. 1-4, the door 190 for the laundry appliance 10 can include a deflector 192, such as an angled surface of the door 190. As the ozone gas 14 and/or the ozone-containing fluid 100 flows through the bellows 120 and into the drum 18, this flow can engage the deflector 192 and be redirected into the drum 18. This deflector 192 can typically have a curved or other arcuate shape that provides for a spread of the ozone-containing fluid 100 from the deflector 192 and through a large portion of the processing space 16. This configuration provides for a large area of saturation by the ozone gas 14 and/or the ozone-containing fluid 100. Accordingly, this configuration creates a direct interaction between the ozone and the articles 22 for sanitizing the articles 22 at a certain point in the laundry cycle 250.

Referring now to FIGS. 1-8, the ozone gas 14 can be directly injected through the bellows 120 via a dedicated ozone tube 210 that is separated from the dispenser 80. In such an aspect of the device, a three-way valve 212, such as a solenoid valve, a coil valve 214 or other similar valve can be used for regulating the amount and velocity of the ozone gas 14, the chemistry 82 and the carrier fluid 86. In the case of a coil valve 214, the three-way valve 212 can include various coils for controlling the flow of carrier fluid 86 and cleaning chemistry 82. A separate ozone coil 216 can be included for controlling the flow of ozone gas 14 into the drum 18. In certain aspects, the coil valve 214 can include a three-way coil valve 214 that includes separate coils for controlling the flow of carrier fluid 86, cleaning chemistry 82 and ozone gas 14, respectively. The selective energization of the ozone coil 216 for the three-way coil valve 214 controls the release of ozone gas 14 into the drum 18.

Typically, upon activation of the ozone generator 24 and the ozone coil 216 of the three-way coil valve 214, ozone gas 14 flows from the ozone generator 24, through the coil valve 214 and into the drum 18, typically via a dedicated ozone tube 210 and through the bellows 120. In this configuration, it is typical that the ozone gas 14 is maintained separate from the carrier fluid 86 and the cleaning chemistry 82. Additionally, this configuration provides for the mixing of the ozone gas 14 with the carrier fluid 86 and the cleaning chemistry 82 within the drum 18 as these fluids 44 are dispensed through the bellows 120 and into the drum 18. Accordingly, the splashing of these materials against the articles 22 being processed provides for the mixing of these materials during processing. Also, these injection nozzles can be directed toward one another such that these fluids 44 can be mixed within an intersection point within the processing space 16 at which the various nozzles contained within the bellows 120 are pointed toward one another. Accordingly, a limited amount of mixing can occur within the processing space 16 before these fluids 44 reach surfaces of the articles 22 being processed.

According to various aspects of the device, the laundry appliance 10 can include multiple injection points 230 for the ozone gas 14 to be injected into the drum 18 and/or the tub 20. By way of example, and not limitation, the location of these injection points 230 can include through the bellows 120, into the sump 50, from a rear portion of the tub 20 and in other similar locations of the tub 20 and the drum 18. In certain aspects of the device, ozone gas 14 can also be distributed into the drum 18 via an airflow path 232 where temperature-controlled process air 234 can be used for delivering the ozone gas 14 into the drum 18 for treating the articles 22 during one or more steps of the laundry cycle 250.

Figure 9:
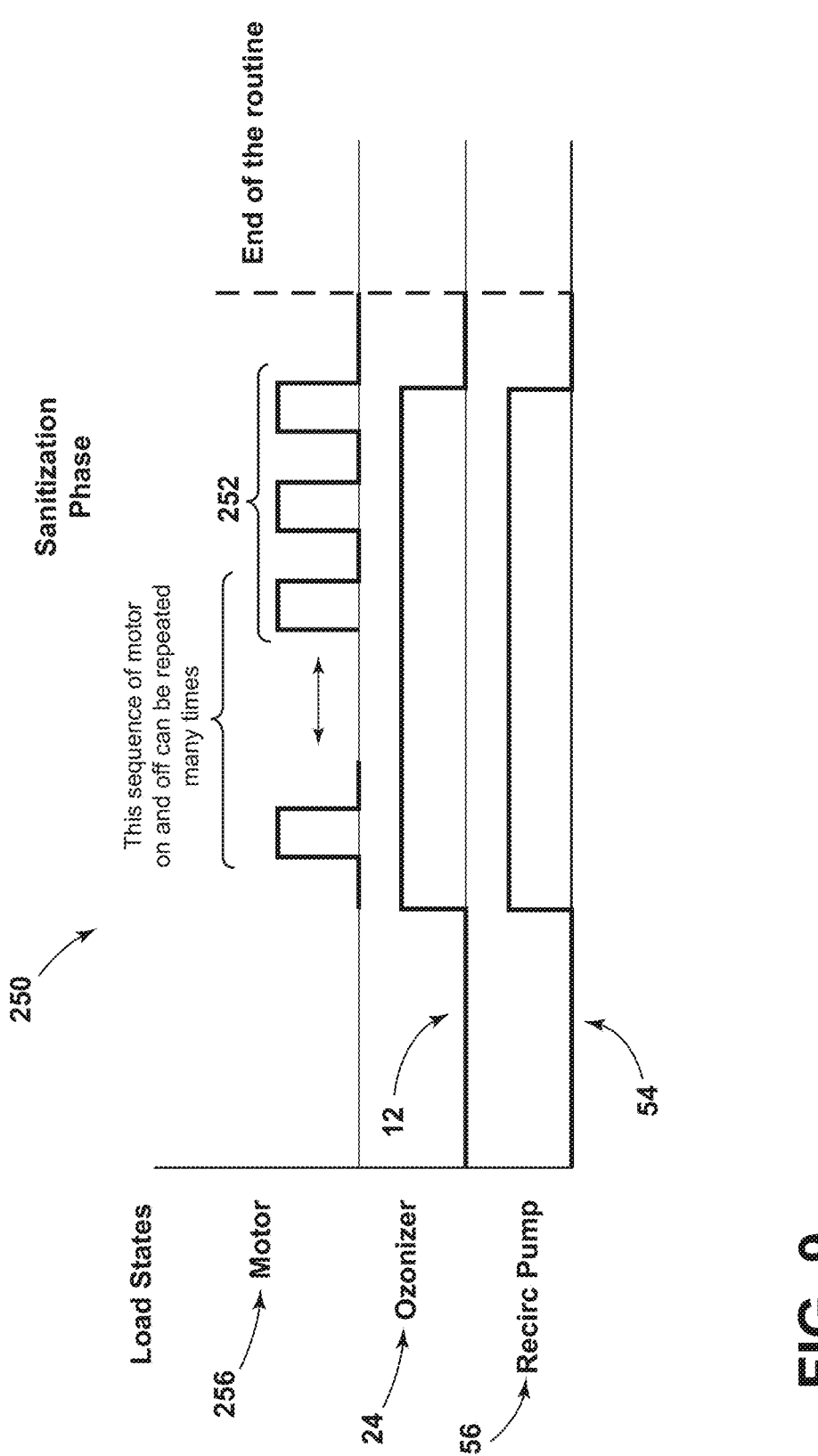
FIG. 9 is a schematic diagram showing activation sequences of various systems of a laundry appliance, including a sanitization system.
Figure 10:
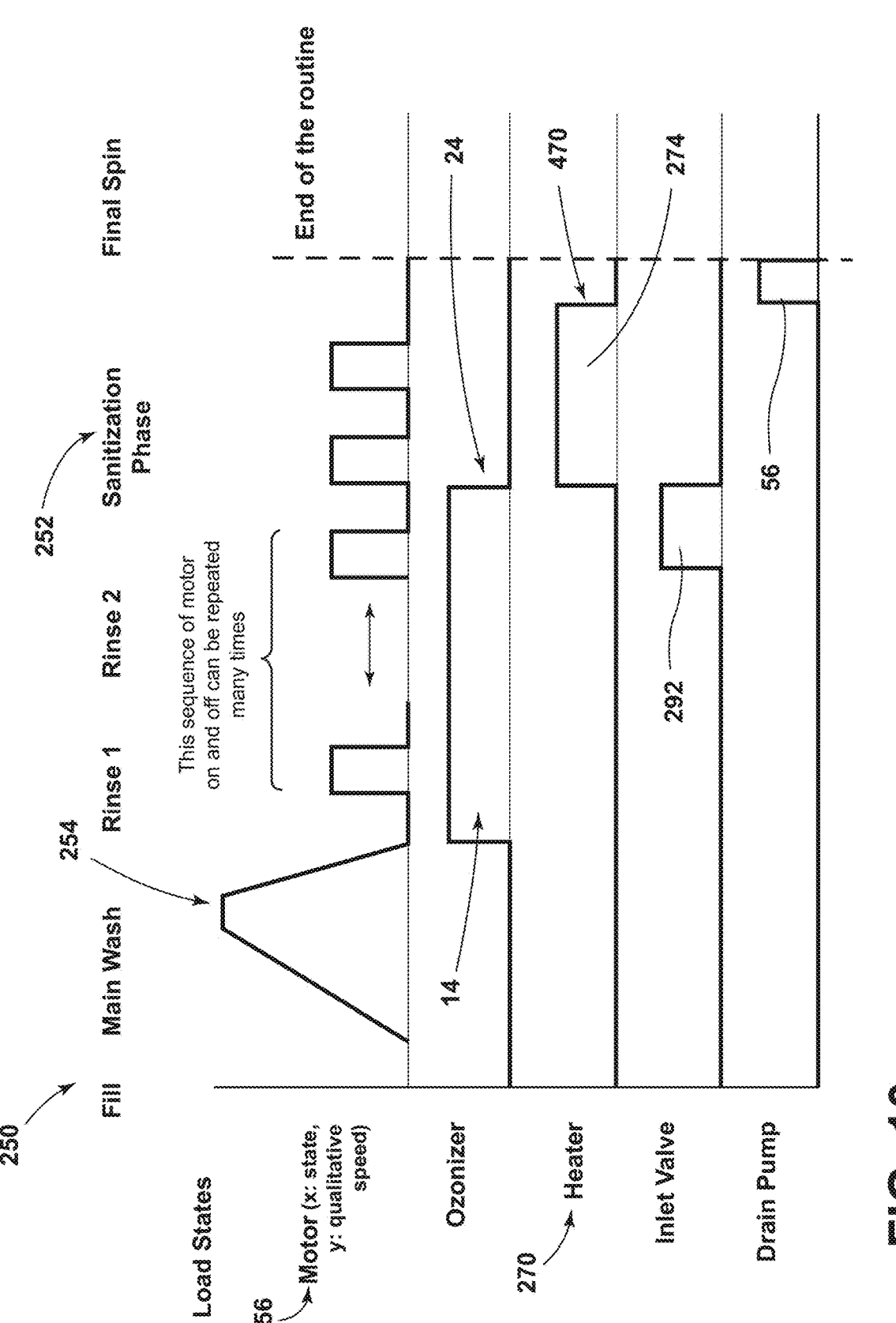
FIG. 10 is a schematic diagram showing activation sequences of various systems of a laundry appliance, including a sanitization system.

According to certain aspects of the device, as exemplified in FIGS. 9 and 10, the laundry cycle 250 operated by the laundry appliance 10 can include a sanitization cycle 252 that is utilized for injecting ozone gas 14 for an ozone-containing fluid 100 into the rotating drum 18 for sanitizing the articles 22. This sanitization cycle 252 can utilize an intermediate spin cycle 254 of the laundry cycle 250 to extract a majority of the fluid 44 from the articles 22 being treated. This intermediate spin cycle 254 can be in the form of a high-speed fluid extraction cycle 496 that rotates the drum 18 at a high rate of speed. Subsequent to this intermediate spin cycle 254, the ozone generator 24 is activated after the fluid extraction is complete. In certain aspects of the device, the ozone generator 24 can be activated before the completion of the intermediate spin cycle 254 to prepare an amount of ozone gas 14 be delivered into the drum 18. The ozone gas 14 from the ozone generator 24 is injected into the drum 18 as the drum 18 rotates. In this manner, as the drum 18 rotates, the ozone gas 14 is able to engage all of the clothing within the drum 18 as the drum 18 rotates. During this injection phase, a motor 256 operates the drum 18 to rotate at a slower speed than that experienced during the intermediate spin cycle 254.

According to various aspects of the device, the delivery of ozone can be accomplished as the drum 18 rotates through various patterns, sequences and speeds. By way of example, and not limitation, the drum 18 can rotate intermittently to allow the ozone gas 14 to be directed toward specific portions of the articles 22 being processed for a particular period of time. When this time period lapses, the drum 18 can rotate a particular rotational distance to allow the ozone gas 14 to engage a separate portion of the articles 22 being processed. This sanitization cycle 252 continues throughout a certain amount of rotations of the drum 18 or after a certain amount of time has lapsed.

At the completion of the sanitization cycle 252, the ozone remaining within the drum 18 is deteriorated. This deterioration can occur through various processes and steps, as will be disclosed herein. In at least one aspect of the device, this deterioration can occur using a heater 270 that heats air to an elevated temperature and delivers the heated air 272 within the drum 18. This heated air 272, in turn, elevates the temperature of the processing space 16 within the drum 18 at the conclusion of the sanitization cycle 252. In certain aspects, heated fluid 274 can also be used for deteriorating the remaining ozone. In such an aspect, heated water can be placed within the interstitial space 42 between the drum 18 and the tub 20, such as in the sump 50. This heated fluid 274 can generate heated fluid 274, such as heated air 272 or steam 470, that filters upward and through the perforated wall 48 of the drum 18. The heated fluid 274 can also be recycled through the recirculation system 54 where the heated fluid 274 is injected into the drum 18 for eliminating the excess ozone within the drum 18. Using this process, a subsequent fluid extraction cycle 496 is typically operated to extract excess fluid 44 that is used during the deterioration of excess ozone gas 14.

Referring again to FIGS. 1-10, use of the sanitization mechanism 12 within the appliance 10 is meant to inject ozone gas 14, by itself, or as a component of the ozone-containing fluid 100, within a medium that can be conveniently delivered into the processing space 16 of the appliance 10. Ozone gas 14 is a material that degrades relatively quickly, especially under certain sets of conditions. Extending the life of the ozone gas 14 can be achieved by directly injecting the ozone gas 14 into the processing space 16 or by incorporating the ozone gas 14 within a turbulent state 290 of the carrier fluid 86 or the mixed fluid 88. As discussed herein, mixing of the ozone gas 14 with either the carrier fluid 86 or the mixed fluid 88, both referred to generally herein as wash fluid 292, can be achieved within the mixing chamber 84 or other mixing space where media are combined. Within this mixing chamber 84, the chemistry and the carrier fluid 86 are mixed together to form the turbulent state 290 of the wash fluid 292. In this turbulent state 290, it is typical that the wash fluid 292 will contain a large number of air bubbles 294 permeating through the wash fluid 292. When the ozone gas 14 is injected with this turbulent state 290 of the wash fluid 292, the ozone gas 14 efficiently combines with the wash fluid 292 and mixes with the air bubbles 294. This combination results in a diminished amount of degradation of the ozone gas 14 as it is delivered to the processing space 16. Using this configuration of the mixing chamber 84, the life of the ozone gas 14 can be extended as opposed to mixing the ozone gas 14 within a more laminar flow of the wash fluid 292. The ozone gas 14 combined with the air bubbles 294 that permeate through the wash fluid 292 can be delivered to the processing space 16 without a significant degradation of the ozone gas 14 within the wash fluid 292.

Figure 11:
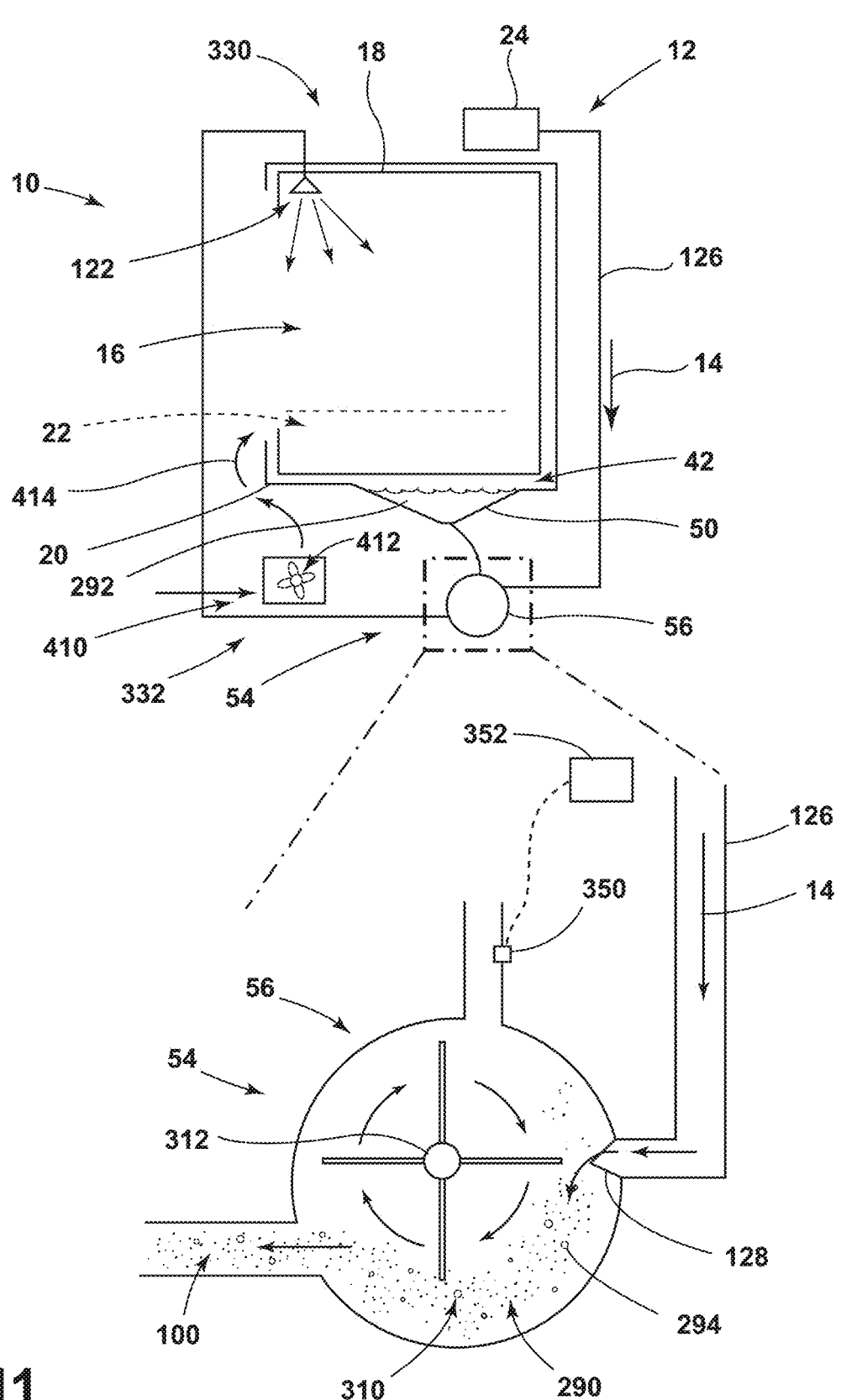
FIG. 11 is a schematic cross-sectional view of a recirculation system and a recirculation pump that mixes ozone gas within a pump volute.

Referring now to FIG. 11, this injection of ozone gas 14 can be accomplished in other locations within the appliance 10. One such location is within the recirculation system 54 for the appliance 10. In particular, the ozone gas 14 can be injected into a certain portion of the recirculation pump 56 so that the ozone gas 14 can be delivered into the processing space 16 with the recirculated wash fluid 292. Additionally, by injecting the ozone gas 14 into the recirculation system 54, additional amounts of ozone gas 14 can be continually injected into the wash fluid 292 for delivering ozone gas 14 to the processing space 16 to sanitize the articles 22 being processed therein. The recirculation pump 56, or other fluid pump contained within the appliance 10 includes a volute 310 that defines an expanded portion of the fluid pump that houses the rotationally impeller 312 of the recirculation pump 56. Within this volute 310, at least one one-way valve 128, or other injection device, can be positioned for allowing for the injection of ozone gas 14 into the volute 310 for the recirculation pump 56. This one-way valve 128 can be in the form of a solenoid, duck bill valve, or other similar actively or passively operated valve that provides for the one-way movement of the ozone gas 14 into the volute 310 for the recirculation pump 56.

The impeller 312 is rotationally positioned within the volute 310 for moving the various forms of wash fluid 292 through the recirculation system 54. As the impeller 312 rotates, the wash fluid 292 is agitated into the turbulent state 290 that includes the plurality of air bubbles 294. These air bubbles 294 are also agitated and within the volute 310 to form a plurality of microbubbles that are included within the air bubbles 294. As discussed herein, when the ozone gas 14 is injected into the wash fluid 292 in the turbulent state 290, the ozone gas 14 readily mixes with the air bubbles 294 contained within the wash fluid 292, with little degradation of the ozone gas 14. The ozone gas 14, now in the form of the ozone-containing fluid 100, is directed into the processing space 16 of the drum 18 to engage with the articles 22 being treated and sanitized within the processing space 16.

Referring again to FIG. 11, use of the one-way valve 128 prevents a backflow of the carrier fluid 86 from entering into the ozone conduit 126 that leads from the ozone generator 24 and to the volute 310 for the recirculation pump 56. This can be done to prevent premature degradation of the ozone gas 14, as well as blockage of the ozone gas 14. In other words, if wash fluid 292 is present within the ozone conduit 126, the ozone gas 14 can be blocked from entering volute 310 of the recirculation pump 56. Additionally, to prevent damage to the ozone generator 24, the ozone generator 24 is typically positioned within a top portion 330 of the appliance 10. In this configuration, the ozone conduit 126 extends from this top portion 330 of the appliance 10 and to a lower portion 332 of the appliance 10 where the recirculation pump 56 is typically located. As described herein, the recirculation pump 56 is typically positioned proximate the sump 50 that is defined within the tub 20. The one-way valve 128 prevents wash fluid 292 within the sump 50 from infiltrating from the pump volute 310 and into the ozone conduit 126.

In addition, because the ozone generator 24 is positioned within a top portion 330 of the appliance 10, the ozone gas 14, which is typically denser than air, tends to fill the ozone conduit 126. The pressure of the ozone gas 14 within the ozone conduit 126, operates the one-way valve 128 to the open state 150 to allow expulsion of the ozone gas 14 from the ozone conduit 126 and into the volute 310 for the recirculation pump 56. Additionally, the one-way valve 128 can be an actively operated valve, such as a solenoid, where the solenoid can control or regulate the amount of ozone gas 14 released into the volute 310 for the recirculation pump 56.

After leaving the recirculation pump 56, the ozone-containing fluid 100 is delivered through the recirculation system 54 and to one or more fill nozzles 122 for injection into the processing space 16 defined within the drum 18. The ozone-containing fluid 100 is spread throughout the processing space 16 for engaging the articles 22 being sanitized. Additionally, the motor 256 for the drum 18 activates to rotate the drum 18 about a rotational axis. As described herein, the drum 18 rotates according to a predetermined pattern, direction, speed and sequence. This rotation of the drum 18 helps to reorganize the articles so that the majority of the surfaces of the articles 22 can be exposed to the ozone gas 14 and engaged by the ozone-containing fluid 100 injected into the processing space 16.

As discussed herein, the recirculation pump 56 receives wash fluid 292 or the ozone-containing fluid 100 from the sump 50. Subsequently, the wash fluid 292 is delivered from the sump 50 and into the recirculation pump 56 to create the ozone-containing fluid 100. Where the ozone-containing fluid 100 is present in the sump 50, the concentration of ozone gas 14 is typically diminished as the ozone-containing fluid 100 is delivered during the sanitization cycle 252. After sanitizing the articles 22, the partially spent ozone-containing fluid 100 flows to the sump 50 for continued recirculation, and additional amounts of ozone gas 14 can then be directed into the volute 310 for the recirculation pump 56. Through this configuration, the concentration of ozone gas 14 within the ozone-containing fluid 100 can be maintained at a consistent level, or can be varied throughout the performance of a particular sanitization cycle 252.

According to various aspects of the device, the ozone gas 14 can also be delivered into a fluid pump that delivers a form of the wash fluid 292 into the processing space 16, but is not necessarily a recirculating pump. This configuration is similar to that of the recirculation pump 56 in that the ozone gas 14 is directed into the volute 310 for the fluid pump. Within the fluid pump, an impeller 312 or other rotationally operable member agitates the wash fluid 292 to produce the turbulent state 290 of the wash fluid 292 within the volute 310 for the fluid pump. The ozone gas 14 is injected into this wash fluid 292 and the turbulent state 290 to be mixed with various air bubbles 294 contained within the wash fluid 292. It is contemplated that this fluid pump can be used to deliver wash fluid 292 into or away from the processing space 16.

According to various aspects of the device, various sensors 350 can be included within the recirculation system 54 that can be used to measure the concentration of ozone gas 14 within the ozone-containing fluid 100. Over the course of a particular sanitization cycle 252, the sensor 350 can be used to instruct a controller 352 to increase, decrease, or otherwise adjust the amount or concentration of ozone gas 14 contained within the ozone-containing fluid 100. This sensor 350 can be used to ensure that a consistent concentration of ozone gas 14 is infused within the ozone-containing fluid 100. In addition, the concentration of ozone gas 14 infused within the ozone-containing fluid 100 can be adjustable depending on the characteristics of the sanitization cycle 252, including the various sanitization operations 358, or sub cycles, that are performed over the course of the sanitization cycle 252.

Where a particular ozone-containing fluid 100 is intended to have a consistent concentration of ozone gas 14, the sensor 350 can be used to monitor how much ozone gas 14 has degraded within the ozone-containing fluid 100. Where a particular amount of ozone-containing fluid 100 has been within the processing space 16 for a longer period of time, greater degradation of the ozone gas 14 can occur. Conversely, where the ozone-containing fluid 100 moves expediently through the processing space 16 and back to the sump 50, less degradation of the ozone gas 14 might be observed. In each of these situations, different amounts of ozone gas 14 can be infused into the ozone-containing fluid 100 at the volute 310 for the recirculation pump 56. The amount of ozone gas 14 delivered to the volute 310 can also vary and change depending upon operation of the ozone generator 24. Where greater amounts of ozone gas 14 are needed, the ozone generator 24 can be active for a longer period of time. The converse is also true where lesser amounts of ozone gas 14 are required such that the ozone generator 24 has a shorter duty cycle.

Figure 12:
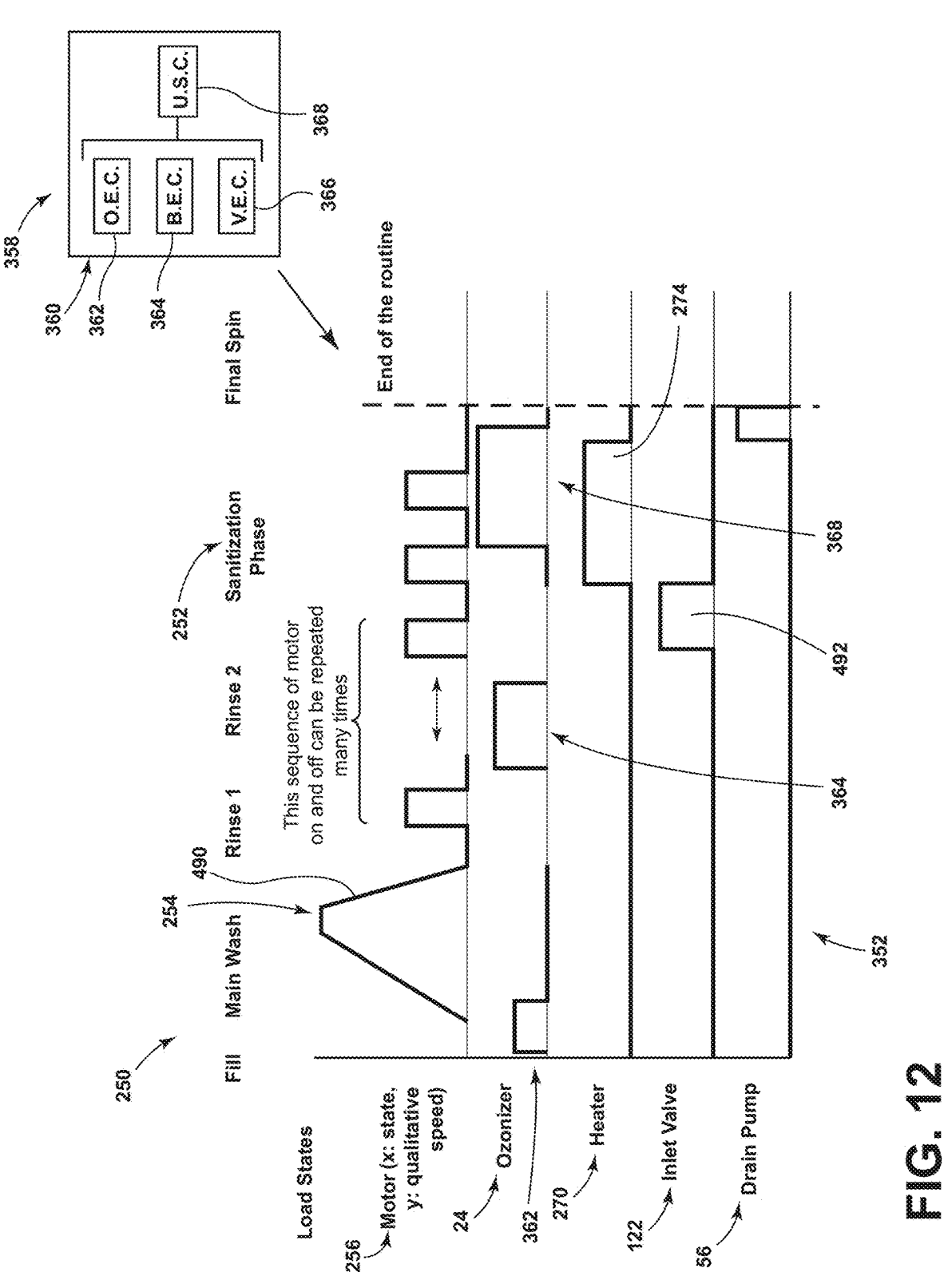
FIG. 12 is a schematic diagram illustrating various aspects of sanitization cycles that include an odor elimination cycle, a bacterial elimination cycle and a virus elimination cycle.

Referring again to FIGS. 11 and 12, the sanitization mechanism 12 for the appliance 10 can include a mechanism for delivering the ozone gas 14 into the drum 18 during a specific rotational operation of the drum 18. The injected ozone gas 14 can also be set to provide for a desired concentration of ozone gas 14, within a flow of process air 234 or within the ozone-containing fluid 100. This concentration of ozone gas 14 can be adjusted by the user or depending upon the type of sanitization that is to occur within the particular sanitization cycle 252.

The user, in setting up the appliance 10 to accomplish a particular laundry cycle 250, can select a desired concentration of ozone gas 14 through use of a user interface 360. It is also contemplated that particular sanitization cycles 252 can be selected, or each selectable sanitization cycle 252 can include a corresponding concentration of ozone gas 14 within an ozone-containing fluid 100. The various sanitization operations 358 that can be performed during a particular sanitization cycle 252 can include an odor elimination cycle 362, a bacterial elimination cycle 364 and a virus elimination cycle 366. Each of the sanitization operations 358 includes a different concentration of ozone gas 14. The odor elimination cycle 362 typically utilizes the lowest concentration of ozone gas 14 and the virus elimination cycle 366 typically utilizes the highest concentration of ozone gas 14. It is also contemplated that a universal sanitization cycle 368 can be utilized. In this aspect of the device, the universal sanitization cycle 368 can include successive operations of all of the sanitization operations 358 or sub cycles. Typically, the sequence, or succession, of these sanitization operations 358 will be the odor elimination cycle 362, the bacterial elimination cycle 364 and, finally, the virus elimination cycle 366.

It is contemplated that the virus elimination cycle 366 will typically be the final operation of the universal sanitization cycle 368. The virus elimination cycle 366 uses a greater amount of heat, in the form of heated air 272 or heated fluid, for eliminating viruses that can be present in the articles 22 and the processing space 16. In addition to eliminating viruses, the use of a heater 270 is typically used as one method for degrading or otherwise eliminating ozone gas 14 from a particular space. By increasing the temperature of the processing space 16, the ozone gas 14 can be used to eliminate various viruses that are on and within the articles 22 being processed. Also, the use of the heater 270 serves to degrade the ozone gas 14 present within the processing space 16.

Referring again to FIGS. 11-12, use of the various sanitization operations 358 as well as the universal sanitization cycle 368 can be operated through the use of the ozone gas 14 that is directly injected into the processing space 16, as well as through the use of the ozone-containing fluid 100 that is delivered to the processing space 16. In either instance, the amount of ozone gas 14 can vary depending upon the particular sanitization operation 358 that is being conducted.

When using ozone gas 14, the amount of ozone gas 14 delivered to the processing space 16 can vary depending upon which sanitization operation 358 is being conducted. Lesser amounts of ozone gas 14 are generally used in the odor-elimination cycle and greater amounts of ozone gas 14 are generally used during the bacterial elimination cycle 364 and the virus elimination cycle 366. When using the ozone-containing fluid 100, the amount of ozone gas 14 infused therein is typically measured based upon a percentage or concentration of ozone gas 14 contained within the ozone-containing fluid 100.

It is contemplated that the various sanitization operations 358 can be conducted at various points during a laundry cycle, typically in the form of a dedicated ozone operation. When conducted at the outset or beginning of a laundry cycle, it can be typical that ozone gas 14 is directly injected into the processing space 16 so that the ozone gas 14 can interact with the still dry articles 22 being processed. In this instance, the ozone gas 14 is able to at least partially penetrate the dry fabric of the articles 22. Where the sanitization operations 358 are conducted later in a particular laundry cycle, ozone-containing fluid 100 can be used for performing the various sanitization operations 358 on fluid that is at least partially saturated with wash fluid 292. With the articles being damp or wet, the ozone-containing fluid 100 can be readily absorbed within the saturated fabric. In this manner, the ozone-containing fluid 100 can readily infiltrate the fabric of the articles 22.

It is also contemplated that the various sanitization operations 358 can be performed at dedicated points within a laundry cycle. By way of example, and not limitation, the odor elimination cycle 362 can be conducted at the outset of a particular laundry cycle. In addition, the odor elimination cycle 362 can be utilized in a refresh condition at the end of a particular laundry cycle or after completion of the laundry cycle. The bacterial elimination cycle 364 and the virus elimination cycle 366 can be conducted within a middle portion or toward the end portion of a particular laundry cycle. In this manner, larger soils and particulate can be removed within an earlier stage of the laundry cycle, before performing the desired sanitization operation 358. It is also contemplate that the universal sanitization cycle 368 and the individual subroutines can be performed as a stand-alone operation, a dedicated laundry cycle or a dedicated cleaning cycle.

Figures 13, 14:
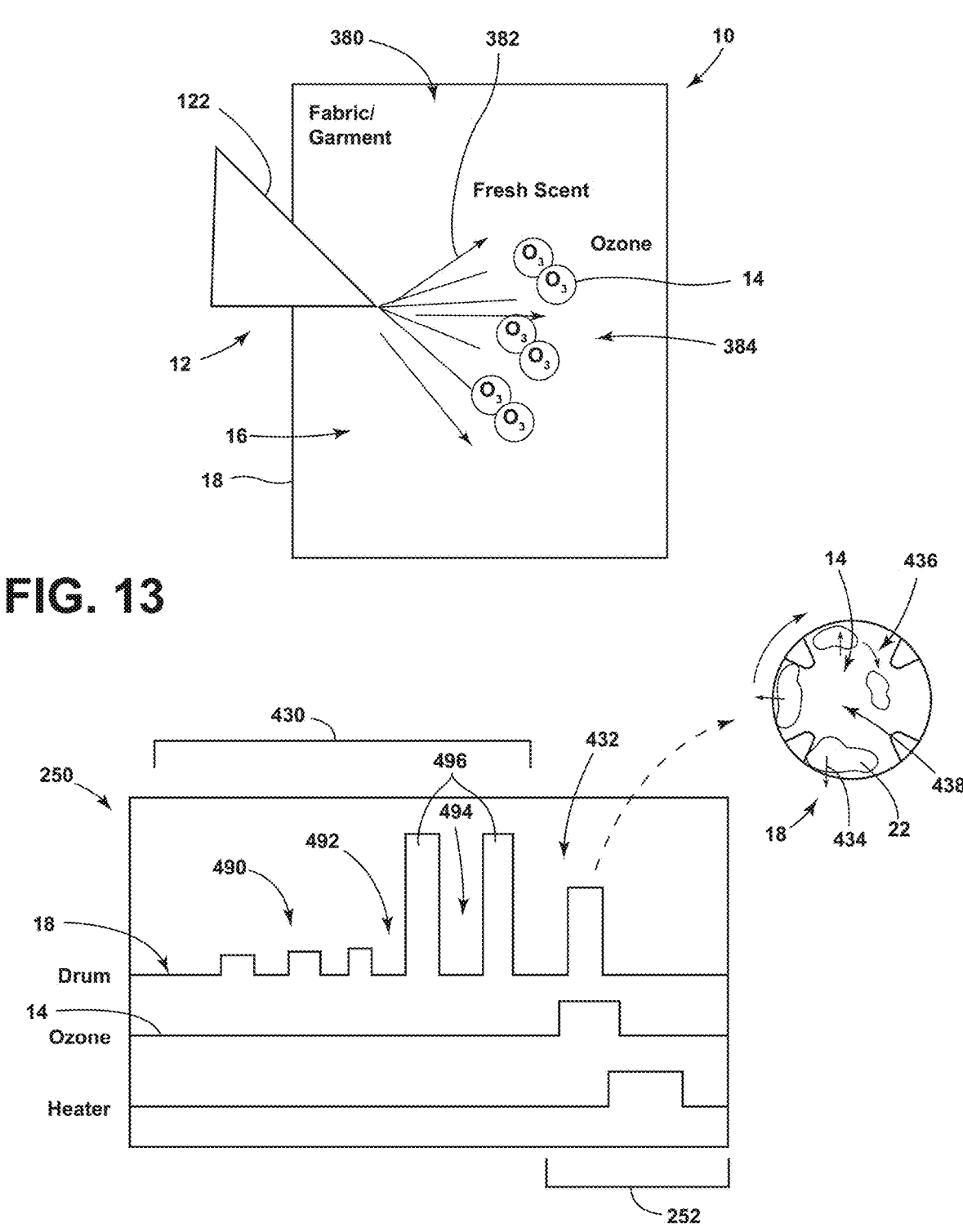
FIG. 13 is a schematic diagram of a laundry appliance showing operation of a fragrance cycle that includes the use of ozone gas.
FIG. 14 is a schematic diagram showing activation sequences of various systems of a laundry appliance, including a sanitization system that operates during a separation operation.

Referring now to FIG. 13, within a particular aspect of the sanitization cycle 252, an odor elimination cycle 362 can include a specific fragrancing function 380 utilized as a sprayed scent 382 for adding a desired fragrance to the articles 22 being processed. In addition to adding the scent 382, the ozone gas 14 can be combined with the sprayed scent 382 for injection into the drum 18. The combination of the scent 382 and the ozone gas 14 forms an ozone-containing spray 384 that operates to eliminate undesirable odors through the use of the ozone gas 14. In addition, the use of the scent 382 adds a more desirable fragrance to the articles 22 being processed. It is contemplated that the ozone-containing spray 384 that contains the scent 382 in the ozone gas 14 can be directed into the drum 18 via a nozzle, sprayer, or other injecting mechanism. It is also contemplated that the ozone gas 14 and the scent 382 can be applied as a mist, where the ozone gas 14 is infused in the substance of the scent 382 for being dispersed through the processing space 16.

According to various aspects of the device, the scent 382 and the ozone gas 14 can be provided contemporaneously or sequentially. Where the delivery of the scent 382 in the ozone gas 14 occurs sequentially, the ozone gas 14 can first be delivered to eliminate material and organisms that typically produce undesirable odors in the articles 22. Subsequently, the scent 382 can be added to the articles 22 for adding the desired fragrance to the sanitized articles 22.

When the ozone gas 14 is infused with the scent 382, the scent 382 can be in a generally fluid or liquid state. In this state, the scent 382 can be used to carry or direct the ozone gas 14 in a downward direction and to the articles 22. During this odor elimination cycle 362, the motor 256 can rotate the drum 18 to reorganize the articles 22 within the processing space 16. As this occurs, the ozone-containing spray 384 can be injected into the processing space 16 to engage a majority of the surfaces of the articles 22. It is also contemplated that the ozone-containing spray 384 can be injected at various injection points 230 that are positioned around the processing space 16.

According to various aspects of the device, various injection points 230 can be utilized for providing a dedicated injection of the ozone gas 14 and the scent 382, respectively. By way of example, and not limitation, the ozone gas 14 can be injected into the processing space 16 from below. In this configuration, the ozone gas 14 is injected in very close proximity to the articles 22. Using this close proximity, the ozone gas 14 experiences little degradation and the concentration of ozone gas 14 as it is being delivered to the articles 22 remains high for achieving the desired sanitization effect. Conversely, the scent 382 can be sprayed or injected into the processing space 16 from above so that the spray can be fanned or spread throughout a majority of the processing space 16. This spray configuration can be used to achieve a large amount of coverage of the scent 382 over the articles 22. Using this configuration of the separate injection points 230, the use of ozone gas 14 and the scent 382 can be used contemporaneously for sanitizing and fragrancing of the articles 22 being treated within the drum 18.

Additionally, various microorganisms such as bacteria and viruses can be eliminated or vastly reduced. Typically, it is these microorganisms that generate the odors that are intended to be eliminated during the odor elimination cycle 362. In addition to eliminating these odors, the scent 382 adds a desired fragrance to the articles 22. The application of the scent 382, as discussed herein, is applied to the articles 22 that is also sanitized. Using this configuration, the scent 382 is not used to cover up an odor, but is added to the articles 22 that has been recently sanitized.

The combination of the scent 382 and the ozone gas 14 can be achieved through separate nozzles that are injected within a common injection point 230. It is also contemplated that scents 382 can be combined within the ozone gas 14 upstream of the nozzle such as within a mixing chamber 84. As discussed herein, agitation of the scent 382 can cause a turbulent state 290 of the scent 382 that can efficiently receive the ozone gas 14 without significant degradation of the ozone gas 14. This ozone-containing spray 384 can then be injected into the processing space 16.

According to various aspects of the device, the scent 382 can be in the form of gaseous fragrance, a liquid-based fragrance, mist, combinations thereof, and other similar forms that can be delivered into the processing space 16 defined within the drum 18. Where the scent 382 is in the form of a liquid, the liquid will typically be placed into the turbulent state 290 to be combined with the ozone gas 14 for delivery as the ozone-containing spray 384. Where the scent 382 is in the form of a mist or gas, the ozone gas 14 can be sprayed contemporaneously or separately into the processing space 16 defined within the drum 18.

According to various aspects of the device, the injection of ozone gas 14 can occur during a dedicated fresh air recovery phase 410. In this aspect of the device, a recovery fan 412, which can be a dedicated fresh-air recovery fan 412 or a multi-use fan within the applicant, can be used to cool the processing space 16 or to otherwise inject fresh or ambient recovery air 414 into the appliance 10. Use of the recovery fan 412 can be utilized in a heat-loop appliance that recirculates process air 234 through a closed airflow path 232. The stream of recovery air 414 can be injected periodically during a particular portion of the laundry cycle. The ozone generator 24 can be placed in communication with the path for the recovery air 414 to be injected into the recovery air 414. This stream of recovery air 414 is typically injected into the drum 18 directly or can be injected at a point in the airflow path 232 that is upstream of the drum 18. The use of this recovery air 414 can add fresh air and also sanitizing ozone gas 14 that can be used to refresh the articles 22 in the drum 18.

According to the various aspects of the device, the ozone generator 24 can be coupled with a valve, baffle or other fluid directing system. This system can be used to selectively deliver ozone gas 14 to any one of various sub-systems for either delivering the ozone gas 14 to the drum 18 or delivering the ozone gas 14 to a mixing chamber 84 to be combined with a wash fluid 292 that forms the ozone-containing fluid 100 or the ozone-containing spray 384. In this manner, a single ozone generator 24 can be used to generate ozone gas 14 for operating any one of several sanitizing mechanisms within the appliance 10. Additionally, these various sanitization mechanisms 12 can be used to perform a sanitization cycle 252 at various points during the performance of a laundry cycle. It is also contemplated that the appliance 10 and the sanitization system can include more than one ozone generator 24 for performing various sanitization operations 358 during operation of the appliance 10.

Referring now to FIG. 14, it is contemplated that the sanitization cycle 252 can occur during a particular and dedicated rotational operation of the drum 18. During a standard operation 430 of the laundry cycle for a combination washing/drying appliance 10, the motor 256 operates the drum 18 at various speeds and configurations. These configurations can include a tumble operation for mixing and rearranging the articles 22, an agitating cycle where the drum 18 typically oscillates, and an extraction cycle 496 where the drum 18 rotates at a high rate of speed for extracting wash fluid 292 from the articles 22. In operating the sanitization cycle 252, the ozone gas 14 can be delivered into the articles 22 at a separate rotational operation that can be described as a separating operation 432. In this separating operation 432, the drum 18 rotates at a fast-tumble speed that is slower than an extraction phase but faster than a typical tumble phase. Through the use of this separating operation 432, the articles 22 are moved within the drum 18 at a speed sufficient to produce a minimal centrifugal force 434 that presses the articles 22 against the drum 18 as it rotates a majority of one rotation. When the articles 22 reaches the top of the rotational path of the drum 18 or near the top of the rotational path of the drum 18, the force of gravity overcomes the produced centrifugal force 434 and the articles 22 falls toward the bottom of the rotational path of the drum 18. Using this separating operation 432, greater amounts of sanitizing space 436 are achieved between the individual articles 22. This separating operation 432 also generally maintains a central space 438 of the drum 18 where the articles 22 are free falling in a partially separated and generally less dense state. This configuration of the articles 22 in the central space 438 provides a path through which the ozone gas 14 or the ozone-containing fluid 100 can be dispersed throughout the drum 18 and also onto a large surface area of the articles 22 within the drum 18.

Using this increased sanitizing space 436, ozone gas 14, an ozone-containing spray 384, or an ozone-containing fluid 100 can be injected into the processing space 16 for achieving greater dispersion and greater coverage against the surfaces of the individual articles 22 within the drum 18. Because the articles 22 are at least partially separated from one another as they are moved according to the separating operation 432, the ozone gas 14 can infiltrate to greater amounts of the articles 22. Also, using the separating operation 432, the individual articles 22 are separated from one another and sections of each article 22 is also separated from one another. By way of example, and not limitation, the sleeves of a shirt are able to separate and move away from the torso of the shirt so that the ozone gas 14 can engage greater amounts of the surface area of the shirt at any one time and over the course of the sanitization cycle 252. Use of the separating operation 432 provides an increased efficiency for the use of ozone gas 14 so that greater amounts of the articles 22 are engaged and sanitized by the ozone gas 14 at any particular moment in time and over the course of the sanitization cycle 252.

According to the various aspects of the device, use of the separating operation 432 can vary depending on the point at which the sanitization cycle 252 is initiated. Where the sanitization cycle 252 is initiated at the outset of a particular laundry cycle, a separating operation 432 can be faster, typically in the form of a fast-tumble rotational operation, to achieve a slightly greater centrifugal force 434 that produces a greater tumble for separating the individual articles 22. Where the separating operation 432 is started after the clothing has been wetted and has a greater mass, the separating operation 432 can be slower to allow for the individual articles 22 to fall away from the interior surface of the drum 18 as the drum 18 rotates about the rotational axis.

In certain aspects of the device, where the sanitization operation 358 occurs over the course of a particular drying cycle, the speed at which the separating operation 432 is performed can change over time. As discussed herein, use of a faster separating operation 432 is typically utilized where the articles 22 has less water trapped within the fabric. Accordingly, the speed of the separating operation 432 can increase over time as the articles 22 dry over the course of the particular drying cycle.

As discussed herein, use of the separating operation 432 is used to expose greater amounts of the surface area of the individual articles 22 at any one time. This increase in the amount of exposed surface area of the articles 22 provides for greater exposure to the ozone gas 14 during a sanitization cycle 252. Accordingly, less amounts of ozone gas 14 may be utilized over the course of the sanitization cycle 252. In addition, the effectiveness of the ozone gas 14 during the sanitization cycle 252 can provide for higher concentrations of ozone gas 14 or higher concentrations of ozone gas 14 within an ozone-containing fluid 100 that can be utilized during a particular sanitization cycle 252. Accordingly, the concentration of ozone gas 14 within a particular ozone-containing spray 384 or ozone-containing fluid 100 can be maintained at a higher concentration over the now-shortened and more efficient sanitization cycle 252.

Figure 15:
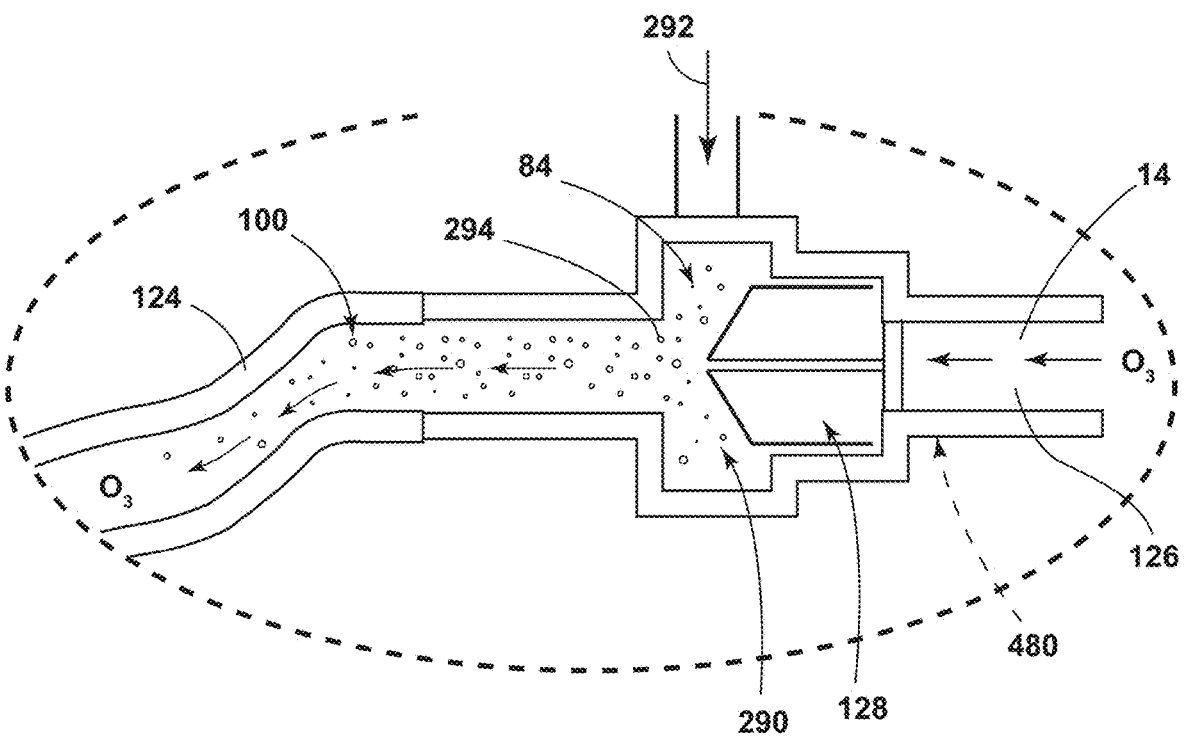
FIG. 15 is a schematic diagram of a mixing chamber that is used to mix wash fluid and ozone gas to form the ozone-containing fluid.

Referring now to FIG. 15, the delivery of ozone gas 14, in the form of the ozone-containing fluid 100, can be accomplished within a mixing chamber 84 that combines wash fluid 292 with the ozone gas 14 at a particular mixing chamber 84. Within an exemplary mixing chamber 84, a two-way valve is included where a first valve regulates the movement of ozone gas 14 into the mixing chamber 84. The second valve can be used to control the flow of wash fluid 292 into the mixing chamber 84. This mixing chamber 84 can be configured as a small or confined location, such as a junction between the first valve for the ozone gas 14 and the second valve for the wash fluid 292. The mixing chamber 84, in these configurations, and as discussed above, is used for generating the turbulent state 290 of the wash fluid 292 to allow for the mixture of ozone gas 14 with the generated air bubbles 294 within the turbulent state 290 of the wash fluid 292 within the mixing chamber 84.

Referring again to FIG. 15, the combination and mixture of the ozone gas 14 and the wash fluid 292 can be accomplished through a human machine interface (HMI) 460 as well as an automatic control unit (ACU) 462. Using these mechanisms, which are typically coupled with a user interface 360 for the appliance 10, the amount and concentration of ozone gas 14 contained within the ozone-containing fluid 100 can be regulated and monitored. This selected concentration can be useful in determining and performing the type of sanitization cycle 252 that is used within the appliance 10. In addition, the HMI 460 and the ACU 462 can be used for operating the first valve and/or the second valve that are positioned adjacent to the mixing chamber 84 that defines the turbulent state 290 of the wash fluid 292. The ozone-containing fluid 100, from the mixing chamber 84, can be carried to the fill nozzle 122 via a supply hose 124 for dispensing the ozone-containing fluid 100 into the processing space 16 of the drum 18. Accordingly, either the first valve, the second valve, or each of the first and second valves can be an actively controlled valve, such as a solenoid, servo-operated valve, or other similar actively-controlled valve assembly. The various configurations of the valve assemblies described herein can each be controlled, monitored and regulated using the HMI 460 and the ACU 462 that are coupled with the user interface 360 and controller 352 for the appliance 10.

Referring again to FIGS. 4-8, in certain aspects of the device, the ozone generator 24 can be activated when any of the wash fluids 292 are not being provided by the supply hose 124. In the absence of these fluids, ozone gas 14 is able to travel through the supply hose 124 and/or the ozone conduit 126 to be injected directly into the processing space 16 of the drum 18. In other aspects of the device, the ozone generator 24 can be activated when the supply hose 124 is providing a wash fluid 292 into the drum 18. In these aspects of the device, the ozone gas 14 is mixed with the wash fluid 292 to form the ozone-containing fluid 100. This combination typically occurs, as discussed herein, within a mixing chamber 84 that defines a turbulent state 290 of the wash fluid 292 within which the ozone gas 14 is mixed. The formed ozone-containing fluid 100 can then be directed through the supply hose 124 and into the processing space 16 of the drum 18.

As discussed herein, the ozone-containing fluid 100 can be moved through any one of various injection points within and around the processing space 16. In certain examples, the ozone-containing fluid 100 can be directed at an inner surface of the door 190, such as a deflector 192, where the ozone-containing fluid 100 can be spread and dispersed throughout the processing space 16. This spray provides for even coverage of the ozone-containing fluid 100 over the surfaces of the articles 22 being processed. In addition, this configuration creates a direct interaction between the ozone gas 14 within the ozone-containing fluid 100 and the articles 22 being processed.

According to various aspects of the device, the turbulent state 290 of the wash fluid 292 can be achieved through various mechanisms. In certain examples, a Venturi tube 480 can be utilized for generating a turbulent state 290 of the wash fluid 292 as it leaves the Venturi tube 480 and enters the mixing chamber 84 or other mixing area. It is also contemplated that the Venturi tube 480 can be used as the fill nozzle 122 that directs the wash fluid 292 or the ozone-containing fluid 100 into the processing space 16. Using the Venturi tube 480, the wash fluid 292 that is directed into the processing space 16 can be converted into a mist, spray, or other forms of fluid that include micro-droplets of material that is dispersed throughout the area of the processing space 16. In addition to the Venturi tube 480, other shapes and configurations of fill nozzles 122 can be utilized for generating any one of various spray patterns that can be used for dispersing the particular wash fluid 292, the ozone-containing fluid 100 as well as the ozone gas 14 throughout the processing space 16.

Referring again to FIGS. 9 and 10, according to various aspects of the device, a method for conducting a laundry cycle can include a sanitization cycle 252. In certain aspects, this sanitization cycle 252 can occur after a wash cycle 490. The sanitization cycle 252 can also occur after one or more rinse cycles, such as after a first rinse cycle 492 or after a second rinse cycle 494. During the sanitization cycle 252, a carrier fluid 86, typically in the form of fresh water or tap water is directed into the interstitial space 42 positioned between the tub 20 and the drum 18. Typically, an amount of carrier fluid 86 within the interstitial space 42 is directed to the sump 50. This amount of water is typically sufficient to fill the sump 50, but not sufficient to reach the outer surface of the drum 18 or enter into the drum 18 via the perforated wall 48.

By way of example, and not limitation, this amount of carrier fluid 86 within the sump 50 can be approximately 1.5 liters to approximately 2.0 liters of carrier fluid 86 that is directed into the sump 50 of the tub 20. This amount of the carrier fluid 86 provides for a higher concentration of ozone gas 14 per milliliter of carrier fluid 86 to arrive at a higher concentration of ozone gas 14 within the ozone-containing fluid 100. As discussed herein, the carrier fluid 86 within the sump 50 is directed into the recirculation system 54 of the appliance 10. At any one of various points within the recirculation system 54, the ozone generator 24 is used to selectively inject ozone gas 14 into the carrier fluid 86 being recirculated through the recirculation system 54. The various points are described herein. Typically, the injection of ozone gas 14 will occur at a point where the carrier fluid 86 is undergoing a change to a turbulent state 290 where numerous air bubbles 294 are generated within the carrier fluid 86.

During the sanitization cycle 252, the ozone generator 24 is activated to begin selectively injecting the ozone gas 14 into the recirculation system 54. Typically, the ozone generator 24 operates according to a high duty cycle and remains activated for a significant portion of the entirety of the sanitization phase. It is also contemplated that the ozone generator 24 can be selectively activated for the entire sanitization cycle 252. The recirculation pump 56 is activated and operates to recirculate the carrier fluid 86 from the interstitial space 42 and/or the sump 50. This carrier fluid 86 is moved to the mixing chamber 84 where the ozone gas 14 is combined therein to form the ozone-containing fluid 100. This ozone-containing fluid 100 is then directed to the drum 18 to sanitize the articles 22 contained therein. This ozone-containing fluid 100 that has sanitized the articles 22 is then filtered, according to the force of gravity, through the articles 22 and through the perforated wall 48 of the drum 18 to recollect within the sump 50 of the interstitial space 42 between the tub 20 and the drum 18. This process is repeated such that the concentration of ozone gas 14 is either elevated or maintained at a consistent level over the course of the sanitization cycle 252.

As discussed herein, the motor 256 that operates the drum 18 can be operated during the sanitization cycle 252 according to any one of various operational parameters. Intermittent rotation, oscillation, reversal of direction, intermittent stopping of rotation, and other combinations of rotational operations can be performed over the course of the sanitization cycle 252. The purpose of this rotational operation of the drum 18 according to various patterns and sequences is to manipulate and reposition the articles 22 within the processing space 16 so that adequate coverage and sanitization of the articles 22 can occur using the ozone-containing fluid 100. Because the ozone-containing fluid 100 is continually moved through the recirculation system 54 of the appliance 10, the concentration of ozone gas 14 can be maintained at a particular level and can also be adjusted over the course of the sanitization cycle 252. This system provides for a consistent and repeatable sanitizing function of the appliance 10.

During the performance of the particular sanitization cycle 252, it has been found that the ozone gas 14 reduces surface tension. An additional rinse cycle and fluid extraction cycle 496 can be performed after the sanitization cycle 252. In this final rinse cycle, additional carrier fluid 86 and other wash fluid 292 can be disposed within the processing space 16. Because the ozone gas 14 has reduced the surface tension of the material within the processing space 16, greater amounts of the carrier fluid 86 and other wash fluid 292 can be extracted due to the lower surface tension. This configuration allows for better drying of the articles 22 within the laundry appliance 10 as greater amounts of water can be extracted before a drying cycle is initiated. In addition, heat can be used for degrading the ozone gas 14 leftover within the processing space 16 after the sanitization cycle 252. The use of heat can also at least partially dry the articles 22 to decrease the time period used for completing a particular drying cycle within the appliance 10.

According to the various aspects of the device, other methods can be utilized for conducting the sanitization cycle 252. In at least one aspect of the device, cooled air, such as ambient recovery air 414, can be disposed within the processing space 16 for decreasing the temperature within the processing space 16. Using this decreased temperature, the ozone gas 14 will typically have a longer life span. In turn, the ozone gas 14 has a longer period of use where the ozone gas 14 can sanitize the articles 22 and other portions of the laundry appliance 10. Additionally, the cooled environment of the processing space 16 can provide for higher concentrations of ozone gas 14 within the processing space 16 and also within the ozone-containing fluid 100 that is injected into the processing space 16. Utilizing these higher concentrations of ozone gas 14, a higher degree of sanitization can occur over the course of the particular sanitization cycle 252.

As discussed herein, at the conclusion of the sanitization cycle 252, ozone gas 14 is typically degraded and otherwise eliminated from the processing space 16. The use of heat can be used to accomplish this degradation. The heat used as part of a high-heat cycle can be generated through the use of process air that is heated and moved through the processing space 16. This process air heated during the high-heat cycle can degrade the ozone gas 14 and also cause the ozone gas 14 to be moved through the airflow path 232 of the appliance 10 where a faster level of degradation can occur. In certain aspects of the device, as the process air moves the ozone gas 14 through the airflow path 232, the ozone gas 14 is moved past one or more heaters 270, such as heating elements. In these isolated locations within and around the heaters 270, a high temperature can be achieved. Using these high temperatures of the high-heat cycle, the ozone gas 14 can be degraded at the conclusion of the laundry cycle 250 and after delivery of wash fluid to the tub 20 and the drum 18 is compete.

Heat for generating the ozone gas 14 can also be generated by heating wash fluid 292 contained within the sump 50 defined within the surface of the tub 20 and beneath the drum 18. Heating the wash fluid 292 contained within the sump 50 can cause heated steam 470 to rise and matriculate through the perforated wall 48 and through the articles 22. This steam 470 can cause a faster degradation of the ozone gas 14 that is present within the processing space 16. In addition, use of this heated steam 470 or heated air 272 can also elevate the temperature of the articles 22 to evaporate certain amounts of fluid that is entrapped within the articles 22. This process can be used to partially dry the articles 22 contained within the processing space 16.

According to the various aspects of the device, as described herein, the sanitization system and other mechanisms for producing, processing and utilizing ozone gas 14 can be incorporated into any one or more of various appliances 10. Such appliances 10 can include, but are not limited to, washing appliances, drying appliances, combination washing and drying appliances, refreshing and fragrancing appliances, dish washers, air handling units, air filters and other fluid filters, water heaters, water softeners, combinations thereof and other appliances, fixtures and mechanisms in residential, commercial and industrial settings that treat, clean, filter or otherwise process fluids and other articles 22 to be sanitized.

Figure 16:
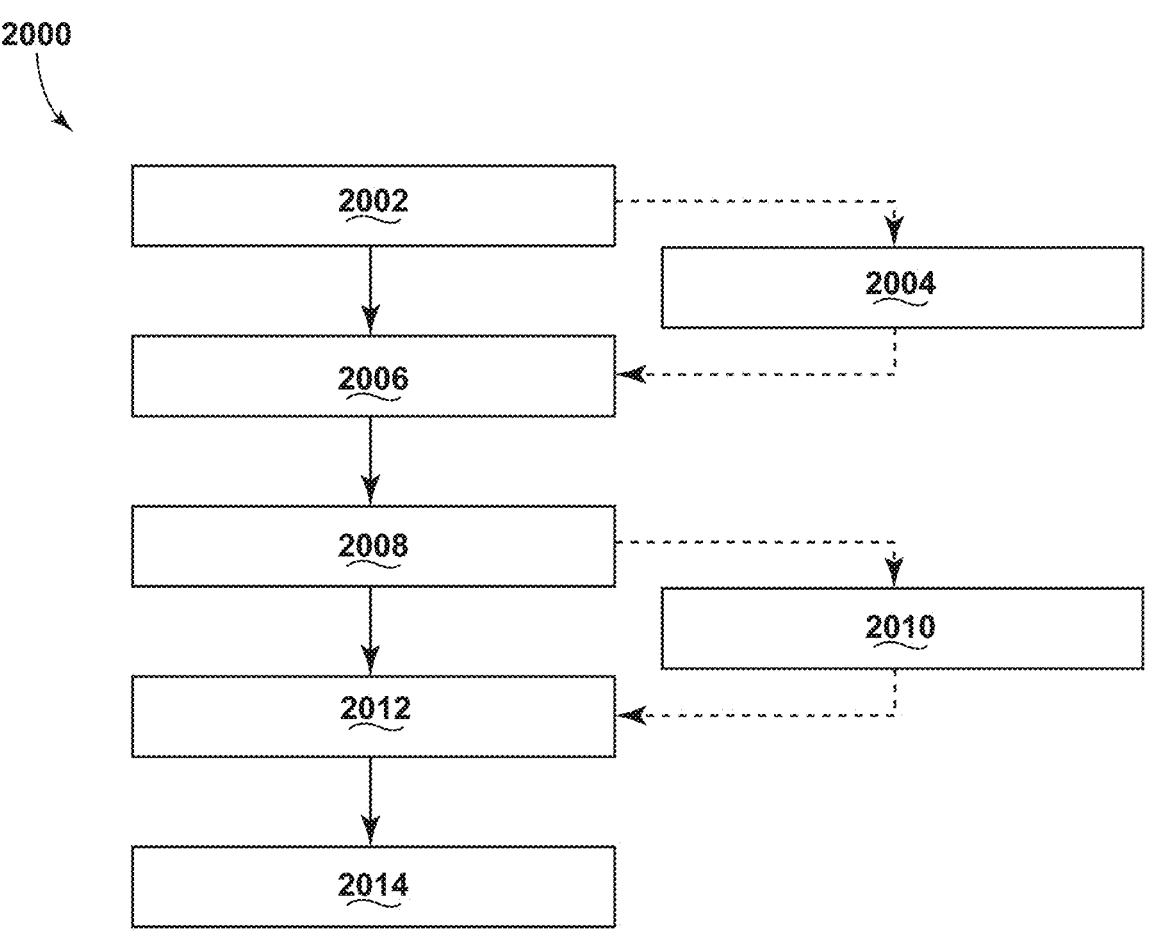
FIG. 16 is a flow chart illustrating a method for performing an ozone decomposition process with water according to various aspects described herein.

Referring now to FIG. 16, a flow chart of a method 2000 for performing an ozone decomposition process with a carrier fluid 86 or other wash fluid 292 is illustrated. The method 2000 can be performed in the event that an ozone sanitization cycle 252 is activated near or during the end, or post phase, of a laundry cycle 250.

The method 2000 can include an initial step 2002 of filling the sump 50 with a supply of carrier fluid 86, or other wash fluid 292, typically in the form of water. The carrier fluid 86 is delivered into the sump 50. The sump 50 is filled to a level that is below the outer surface of the drum 18. Accordingly, the supply of carrier fluid 86 does not reach the drum 18. In this way, during step 2002 the load of the articles 22 disposed within the drum 18 does not become wet or absorb additional amounts of wash fluid 292. This is useful when a subsequent portion of the laundry cycle 250 includes a drying cycle. Preventing the addition of wash fluid 292 into the articles 22 helps to prevent a loss of efficiency with respect to the later drying cycle and the laundry cycle 250 as a whole.

In some aspects, the method 2000 includes a steam vapor generation step 2004. In step 2004, the carrier fluid 86 is supplied until a heating element or other heater 270 is in contact with the supply of carrier fluid 86. In this way, the heater 270 can be fully or partially covered by the supply of carrier fluid 86. Where certain heaters 270 are used, such as gas-powered heaters, the carrier fluid 86 is positioned near the heater 270. During step 2004, the heater 270 receives electrical current or other power source such that the carrier fluid 86 is heated and heated fluid 274 is generated. This heating of the carrier fluid 86 increases the temperature of the supply of carrier fluid 86 to a temperature configured to generate steam vapor. Typically, where steam 470 is to be generated, carrier fluid 86 is preferred over a mixed fluid 88 that may contain one or more chemistries 82. This can prevent the accumulation of residue resulting from heating one or more chemistries 82.

A next step 2006 can include waiting an amount of time to allow the ozone gas 14 present within the drum 18 and/or tub 20 to decompose. The amount of time can be completed when a controller 352 determines that the level of ozone gas 14 has diminished to a predetermined concentration, which is less than the concentration of ozone gas 14 prior to implementation of the method 2000. Optionally, the amount of time may be predetermined and may include any suitable amount of time. Without wishing to be bound by theory, it is thought that an increased humidity resulting from the supply of carrier fluid 86 being disposed within the sump 50 results in a decrease of time required to allow the ozone gas 14 present within the drum 18 and/or tub 20 to decompose. Moreover, in the event that step 2004 is performed, the high temperature levels and vapor, such as steam 470, can additionally reduce concentration of the molecules of ozone gas 14.

The amount of time needed to decompose a desired amount of ozone gas 14 can depend on the concentration of ozone gas 14 present at the start of the method 2000. In addition, the amount of heat that can be used in a particular version of the method 2000 can vary depending on the type of articles 22 that is present within the drum 18. By way of example and not limitation, a load of delicates may require lower levels of heat to avoid damage to the fibers of the articles 22. Conversely, cotton and other sturdy fabrics may be able to accommodate higher levels of heat.

Also, the point of the laundry cycle 250 at which the method 2000 is initiated can also determine the length of time needed for the method 2000. Where the articles 22 is dry, such as at the beginning of a laundry cycle 250, or toward the end of a drying cycle, less time may be needed as the steam 470 is likely to penetrate and matriculate through the items of articles 22. Where the method 2000 is initiated in the middle of a laundry cycle 250 or at the end of a rinse cycle, the articles 22 is typically wet or partially damp. Wetted fabrics may require more time to decompose the ozone gas 14 present within the drum 18. Therefore, the method 2000 may be operated for a longer time.

Following step 2006, the method 2000 includes a step 2008 of draining the supply of carrier fluid 86 from the sump 50. According to some aspects, the method 2000 may be performed if an ozone sanitization cycle 252 was activated near, or during the end, of a laundry cycle 250. The laundry appliance 10 may remain stagnant, or still, during the method 2000. Optionally, the method 2000 may include an additional step 2010 of gently tumbling the drum 18 to rearrange the articles 22 and facilitate absorption and subsequent decomposition of the ozone gas 14. The step 2010 can be performed at any point in the method 2000, such as before, after, or during any of steps 2002, 2004, 2006 or 2008. Additionally, the controller 352 can stop the flow of power to the heater 270 at any point during the method 2000. This can include before, after, or during any of steps 2004, 2006 or 2008. During or following step 2008, the door 190 of the laundry appliance 10 can be unlocked at another step 2012 such that the user can remove the load of the articles 22. The method 2000 can be completed at step 2014. While illustrated as being sequential, any or all of the steps 2002, 2004 and 2006, 2008 or 2010 can be performed simultaneously or substantially contemporaneously.

Figure 17:
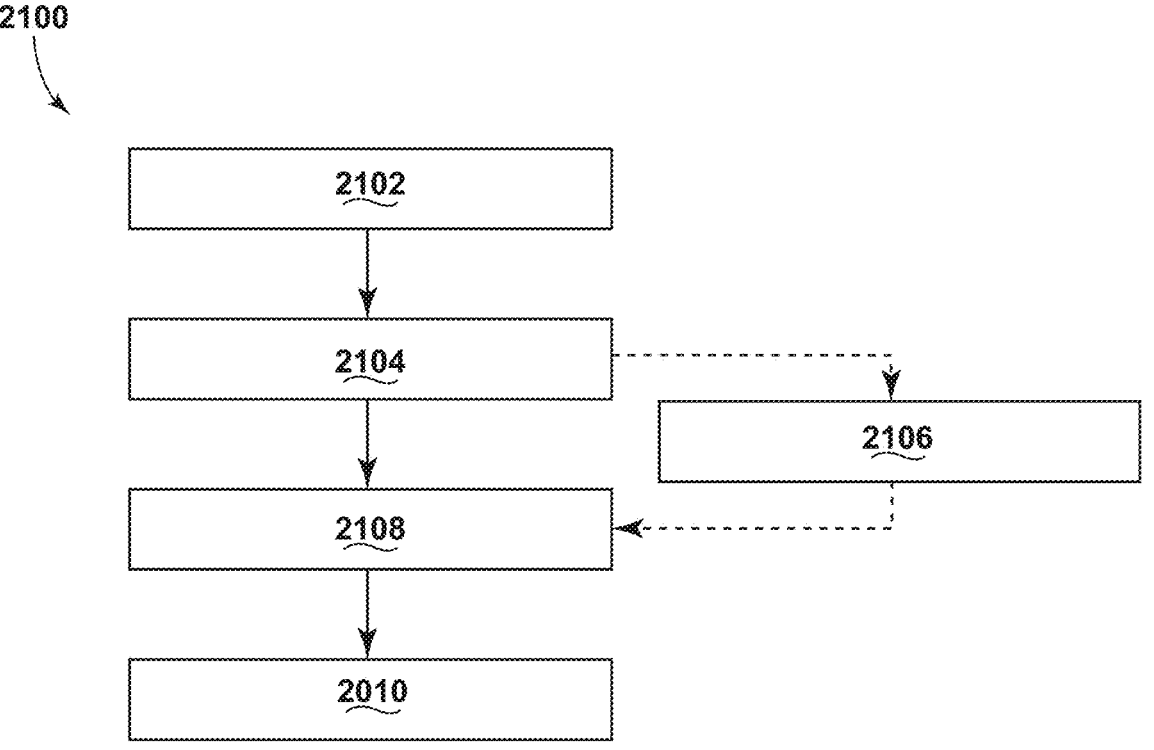
FIG. 17 is a flow chart illustrating a method for performing an ozone decomposition process with dry heat according to various aspects described herein.

Referring now to FIG. 17, a flow chart of a method 2100 for performing an ozone decomposition process with dry heated air 272 is illustrated. The method 2100 can be performed in the event that an ozone sanitization cycle 252 is activated near or during the end, or post phase, of a laundry cycle 250. The method 2100 can include an initial step 2102 of generating dry heated air 272.

In some aspects, the laundry treating appliance 10 can be in the form of a combination washing and drying appliance. Accordingly, the dry heated air 272 can be generated by the same heating and blower system that generates dry heated process air 234 for a drying operation. A next step 2104 can include dispersing the dry heated air 272 throughout the drum 18 which can include a blower fan 4016 to facilitate the movement of the heated air 272 as well as process air 234. Optionally, the method may include an additional step 2106 of gently tumbling the drum 18 to facilitate decomposition of the molecules of ozone gas 14 and to prevent wrinkling of the load of articles 22.

A next step 2108 can include waiting an amount of time to allow the ozone gas 14 present within the drum 18 and/or tub 20 to decompose. The amount of time can be completed when a controller 352 determines that levels of ozone gas 14 have reached a predetermined concentration, which is less than the concentration of ozone gas 14 prior to implementation of the method 2100. Optionally, the amount of time can be predetermined and can include any suitable amount of time. Various sensors 350 can also be used to monitor an amount of ozone gas 14 that is present within the drum 18 and in the process air 234. The high temperature of the dry heated air 272 can facilitate rapid decomposition of the molecules of ozone gas 14, since the half-life of molecules of ozone gas 14 are reduced in the presence of higher temperatures. The method 2000 can be completed at step 2010. In some aspects, the step 2010 is performed simultaneously with one or more of the steps 2102, 2104 and 2106. Further, while illustrated as being sequential, any or all of the steps 2102, 2104 and 2106, 2108 can be performed simultaneously or substantially contemporaneously.

Benefits of the method 2000 and the method 2100, according to various aspects described herein, include quickly reducing the concentration of ozone gas 14 in the laundry appliance 10. This can result in a positive impact on the overall performance time of a particular laundry cycle 250 using a fluid-fill decomposition process, a steam 470 decomposition process, a dry heat decomposition process, as well as a combination of these processes.

Existing solutions for decomposing ozone in other settings require the items being sanitized to remain stagnant for a relatively long period of time (approximately 25-40 minutes or longer) in order to allow the ozone gas to decompose naturally. The solutions described herein decrease this time frame needed for decomposing ozone gas 14 significantly.

Figures 18, 19, 20:
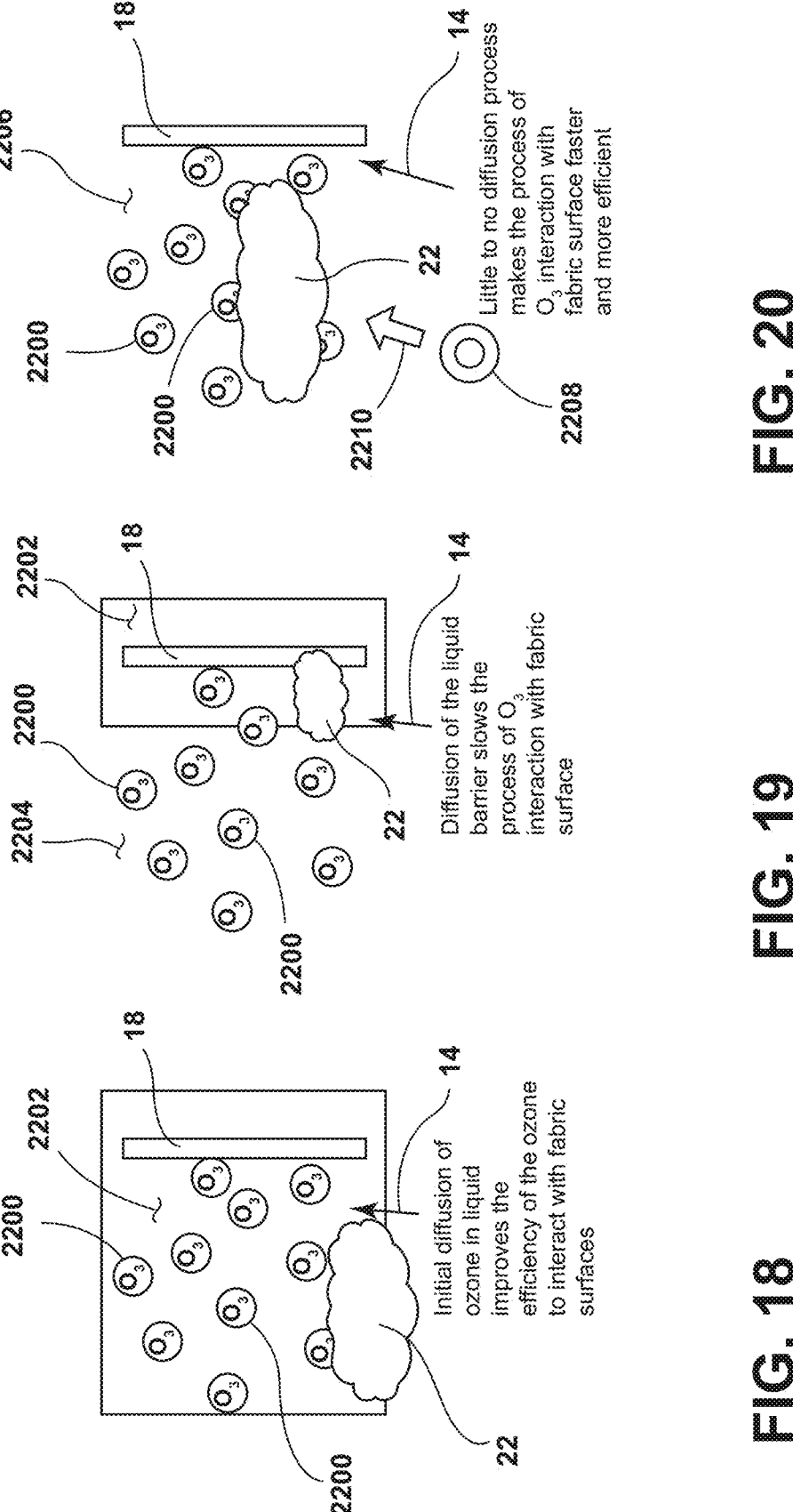
FIG. 18 is a schematic view illustrating ozone-infused water within a drum according to various aspects described herein.
FIG. 19 is a schematic view illustrating a conventional configuration to produce ozone-infused water according to various aspects described herein.
FIG. 20 is a schematic view illustrating ozone-diffused airflow within a drum according to various aspects described herein.

Referring to FIG. 18, the ozone generator 24 can selectively supply ozone gas 2200 to a supply of fluid 2202 to produce ozone-containing fluid 100 for sanitizing the load of articles 22 and/or the laundry treating appliance 10. Since the ozone gas 2200 is applied directly to the fluid 2202, a diffusion process is accelerated as the ozone 2200 does not have to diffuse first from air 2204 and then to fluid 2202 as illustrated in FIG. 19. The ozone-containing fluid 100 can be supplied to the drum 18 having the load of articles 22 therein during a sanitization cycle 252. In some aspects, the ozone-containing fluid 100 is supplied to the drum 18 after completion of a laundry cycle 250. Thus, both the laundry treating appliance 10 and the load of articles 22 can be sanitized simultaneously or at least substantially contemporaneously.

In other aspects, the ozone-containing fluid 100 is supplied to the drum 18 at the beginning of a laundry cycle 250 after wetting of the load of articles 22.

Referring now to FIG. 20, the ozone generator 24 can selectively supply the ozone gas 2200 to airflow 2206 to produce ozone-diffused airflow for sanitizing the load of articles 22 and/or the laundry treating appliance 10. A blower 2208 can be configured to diffuse the ozone gas 2200 within the airflow 2206. The ozone-infused process air 234 can be supplied to the drum 18 while the load of articles 22 is not submerged in wash fluid 292 (i.e. the load of articles is dry or wet). Since the ozone gas 2200 is diffused in the airflow 2206 when the ozone gas 2200 is supplied to the drum 18, no further diffusion is necessary. Consequently, the ozone-infused process air 234 is efficient to neutralize or otherwise eliminate microorganisms. The ozone-infused process air 234 can be applied to a dry load of articles 22 within the drum 18 during a tumbling process at the beginning of a laundry cycle 250. The ozone-infused process air 234 can be pressurized and sprayed onto the load of articles 22. A pressurizer and/or a nozzle 2210 can be configured to pressurize the ozone-infused process air 234. In some examples, the pressurized ozone-infused process air 234 is applied to the load of articles 22 prior to a washing component of a laundry cycle 250 (i.e. the load of articles 22 may be dry). The pressurized ozone-infused process air 234 can be applied to the load of articles 22 for any suitable amount of time, which may include for approximately 30 seconds to kill approximately 99 percent of viruses. In other aspects, the ozone-infused process air 234 is applied to the load of articles 22 after a rinse cycle when wash fluid 292 is drained from the drum 18 (i.e. the load of articles 22 may be wet). In this way, the ozone-infused process air 234 can sanitize the laundry treating appliance 10 and the load of articles 22 simultaneously or substantially contemporaneously.

Figure 22:
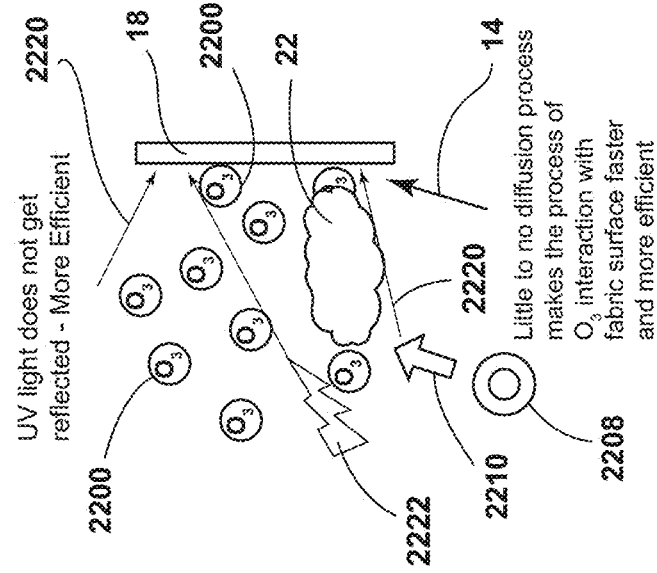
FIG. 22 is a schematic view illustrating application of ultraviolet light to a drum according to various aspects described herein.
Figure 21:
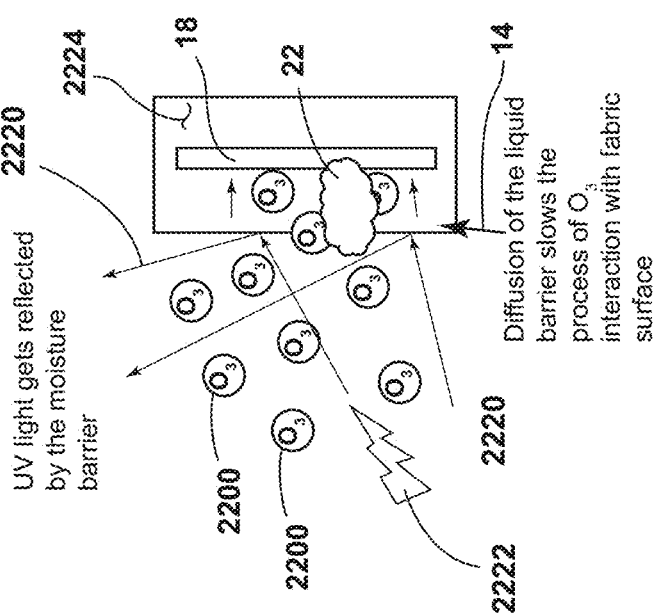
FIG. 21 is a schematic view illustrating a conventional configuration to apply ultraviolet light to a drum according to various aspects described herein.

Referring now to FIGS. 21 and 22, ultraviolet light 2220 may also be emitted for sanitizing the load of articles 22 and/or the laundry treating appliance 10. This use of ultraviolet light 2220 can be implemented during, before, or after any suitable operation of a laundry cycle 250, or independently of any particular event in the laundry cycle 250. In some aspects, the ultraviolet light 2220 can be applied, or emitted, at the same time the ozone-infused process air 234 is applied to the load of articles 22. For example, the ultraviolet light 2220 can be emitted towards the load of articles 22 when the pressurized ozone-infused process air 234 is sprayed toward or onto the load of articles 22 prior to a washing process, as described herein. In another example, the ultraviolet light 2220 can be emitted towards or onto the load of articles 22 when the ozone-infused process air 234 is applied to the load of articles 22 after a washing and draining process, as described herein. The controller 352 can be configured to control a UV light generator 2222 to emit the ultraviolet light 2220 during application of the ozone-infused process air 234. As the load of articles 22 may not be submerged in wash fluid 292 at the time of the ultraviolet light 2220 application, reflection, refraction or other distortion of the ultraviolet light 2220 caused by water 2224, which is illustrated in FIG. 21, is reduced. Accordingly, the ultraviolet light 2220 can more effectively illuminate and penetrate the load of articles 22, which is illustrated in FIG. 22.

Benefits of the ozone-infused process air 234 and the ozone-containing fluid 100, according to various aspects described herein, include effectively sanitizing the load of articles 22 and/or the drum 18 of the laundry appliance 10, thereby making a positive impact on customer satisfaction with a cleanliness quality of a completed load of articles 22. Further, benefits of the ozone-infused process air 234 and the ozone-containing fluid 100, according to various aspects described herein, also include accelerating the diffusion process for ozone gas 14 to reach and engage the load of articles 22. This use of the ozone gas 14 positively impacts the overall time for performing the laundry cycle 250.

Existing solutions that use ozone gas 14 to sanitize items require ozone to diffuse first from air and then to water. These conventional processes are less efficient, can be less effective, and take much longer to complete to arrive at a desirable level of decomposition of ozone gas 14.

Figure 23:
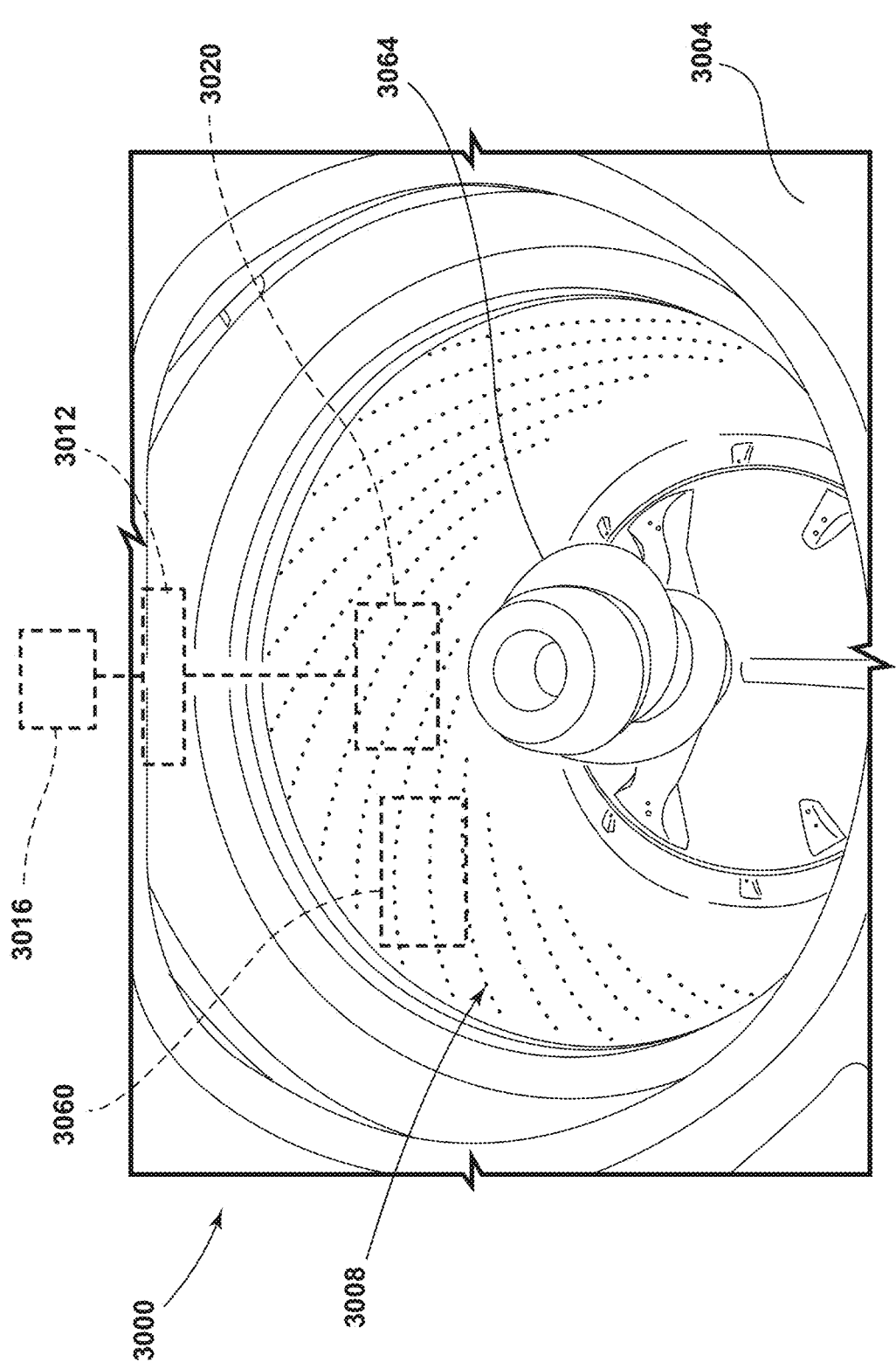
FIG. 23 is a top perspective view of an appliance, illustrating various components thereof, according to one aspect.

Referring to FIG. 23, reference numeral 3000 generally designates an appliance. In various examples, the appliance 3000 can be a laundering appliance. For example, the appliance 3000 may be a clothes laundering appliance (e.g., a clothes washer or a combination washer/dryer). Alternatively, the appliance 3000 may be a kitchenware laundering appliance (e.g., a dishwasher). The appliance 3000 includes a housing 3004. A tub 3008 is positioned within the housing 3004. The tub 3008 may be configured to rotate relative to the housing 3004. The tub 3008 can receive one or more articles 22 to be laundered. The appliance 3000 includes a fluid inlet 3012. The fluid inlet 3012 receives fluid, typically water from a source 3016 (e.g., residential water source, municipal water source, recycled or repurposed water source, well, etc.). The fluid received by the fluid inlet 3012 can be delivered to the tub 3008 in one or more cycles of operation. The appliance 3000 also includes an ozone generator 3020. The ozone generator 3020 is operable between an activated state and a deactivated state. When the ozone generator 3020 is in the activated state, the ozone generator 3020 produces ozone gas 14.

Referring again to FIG. 23, the ozone generator 3020 can be in fluid communication with the fluid inlet 3012. Accordingly, the fluid received by the fluid inlet 3012 can be exposed to the ozone gas 14 produced by the ozone generator 3020 prior to the fluid being introduced into the tub 3008. Therefore, the fluid delivered from the source 3016 can be referred to as untreated fluid and the fluid exposed to the ozone gas 14 produced by the ozone generator 3020 can be referred to as treated water, such as the ozone-containing fluid 100. While the fluid from the source 3016 can be referred to as untreated water, such nomenclature is relative to treatment with ozone gas 14 and is not intended to indicate that the fluid from the source 3016 is entirely untreated. It is contemplated that the concepts disclosed herein are also applicable to entirely untreated water, sometimes referred to as grey water. When the water received at the fluid inlet 3012 has been exposed to the ozone gas 14 produced by the ozone generator 3020, a hardness of the fluid is decreased as a result of such exposure. The fluid can be exposed to the ozone gas 14 produced by the ozone generator 3020 prior to the fluid being introduced to the tub 3008. Alternatively, the fluid can be exposed to the ozone gas 14 produced by the ozone generator 3020 simultaneous to the fluid being introduced to the tub 3008 (e.g., at the time of injection or dispensing). Regardless of the specific timing of the exposure of ozone gas 14, the fluid is delivered to the tub 3008 after the fluid has been exposed to the ozone gas 14 produced by the ozone generator 3020. A flow rate of the fluid can be in a range of about 1 liter per minute to about 3 liters per minute.

Figure 24:
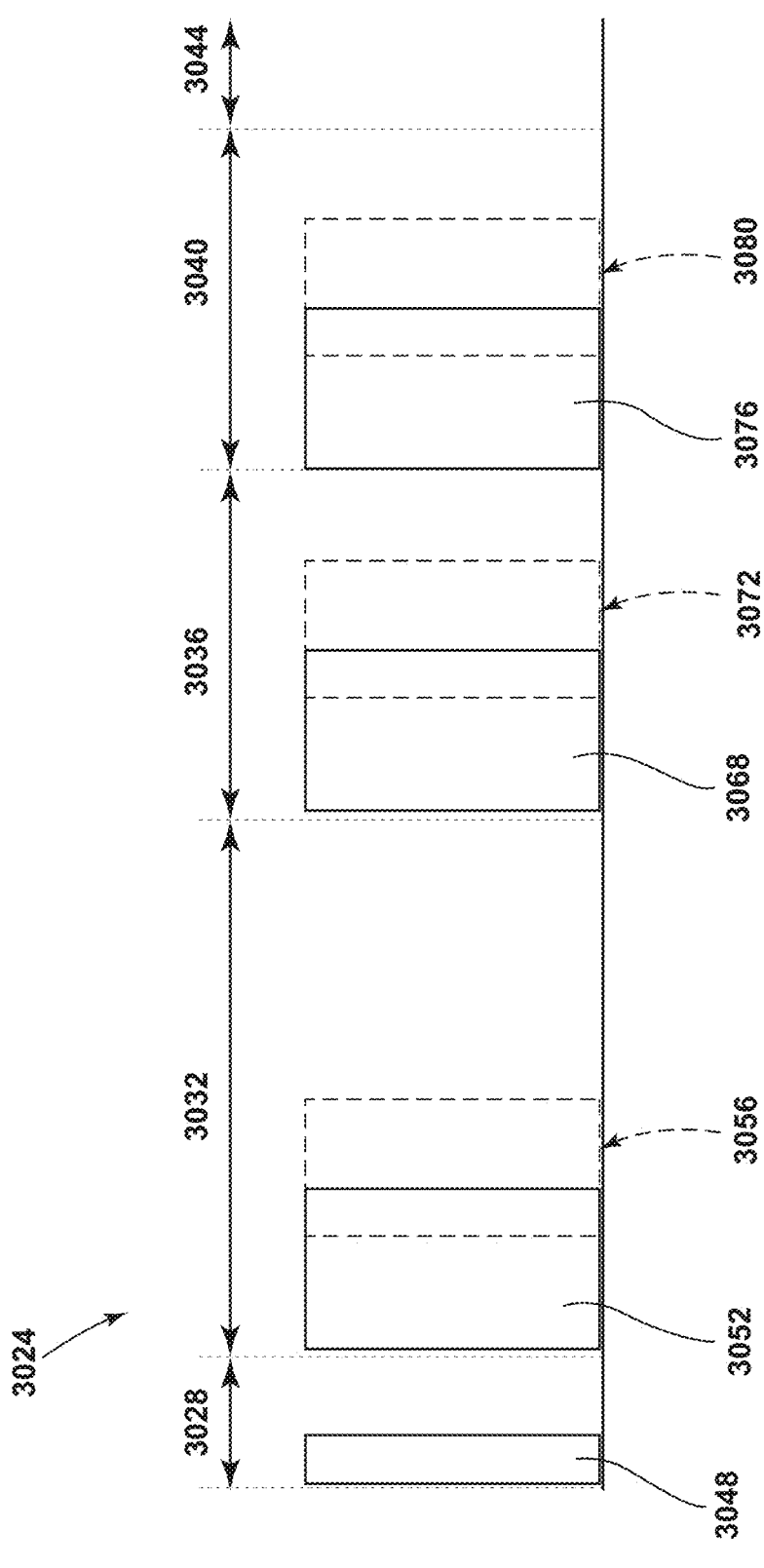
FIG. 24 is a schematic representation of a washing cycle of the appliance, according to one example.

Referring now to FIGS. 23 and 24, in various examples, the fluid that has been exposed to the ozone gas 14 produced by the ozone generator is delivered to the tub 3008 during a washing cycle 3024 of the appliance 3000. FIG. 24 depicts a non-limiting example of the washing cycle 3024. A horizontal axis of the washing cycle 3024 depicted in FIG. 24 represents time. It should be understood that the horizontal axis of the washing cycle 3024 depicted in FIG. 24 may not be to scale and is intended for discussion purposes only. A variety of durations of phases of the washing cycle 3024, as well as a variety of arrangements of the various phases of the washing cycle 3024, are contemplated. For the sake of brevity, every possible iteration of phase duration and/or phase arrangement is not explicitly discussed herein. Rather, the concepts disclosed herein can be applied to create a variety of washing cycles that fall within the scope of the present disclosure.

The washing cycle 3024 can include a pre-wash phase 3028, a machine wash phase 3032, a first rinse phase 3036, a second rinse phase 3040, and/or a final spin phase 3044. The pre-wash phase 3028, the machine wash phase 3032, the first rinse phase 3036, and/or the second rinse phase 3040 can each be separated by an intermediate spin phase. The intermediate spin phase can be used to drain the fluid that was introduced to the tub 3008 during the preceding phase of the washing cycle 3024. In some examples, each of the machine washing phases 3032 and/or each of the rinsing phases (e.g., the first rinse phase 3036 and the second rinse phase 3040) can include activating the ozone generator 3020 for at least a portion of the time when the water is introduced to the tub 3008 in the given phase.

Referring again to FIGS. 23 and 24, the pre-wash phase 3028 can include a pre-wash fill 3048. During the pre-wash fill 3048, a preliminary amount of fluid can be added to the tub 3008 for a first period of time. The pre-wash fill 3048 can provide an initial wetting of the article(s) 22 contained within the tub 3008. In various examples, the ozone generator 3020 can be in the deactivated state such that the fluid delivered to the tub 3008 during the pre-wash fill 3048 has not been exposed to ozone produced by the ozone generator 3020. The machine wash phase 3032 can include a machine wash fill 3052. During the machine wash fill 3052, fluid is delivered to the tub 3008 for a second period of time. The second period of time may be greater than the first period of time. As with the pre-wash fill 3048, the fluid delivered to the tub 3008 during the machine wash fill 3052 can wet the article(s) 22 contained within the tub 3008. In certain aspects of the device, a cleaning chemistry 82 (e.g., a detergent) may be introduced to the fluid prior to delivery to the tub 3008.

During at least a portion of the machine wash fill 3052, the ozone generator 3020 is in the activated state such that the fluid delivered to the tub 3008 during the machine wash fill 3052 has been exposed to the ozone gas 14 produced by the ozone generator 3020. Accordingly, a hardness of the fluid, again, typically water, delivered to the tub 3008 may have been decreased as a result of the exposure to the ozone gas 14 produced by the ozone generator 3020. In some examples, the ozone generator 3020 may be in the activated state for less than an entirety of the machine wash fill 3052.

For example, the ozone generator 3020 may be in the deactivated state at a beginning of the machine wash phase 3032 and/or the ozone generator 3020 may be in the deactivated state at an intermediate point in the machine wash phase 3032. In various examples, the ozone generator 3020 may be placed in the activated state during a final portion of the machine wash phase 3032. In some examples, the ozone generator 3020 may remain in the activated state after the machine wash phase 3032 has been completed (e.g., during a spin cycle immediately following thereafter). The period of time where the ozone generator 3020 is activated can be referred to as an ozonating phase. The machine wash phase 3032 can include a first ozonating phase 3056.

Referring further to FIGS. 23 and 24, in various examples, the appliance 3000 includes a heater 3060. The heater 3060 is operable between an engaged state and a disengaged state. The heater 3060 can be used to heat the fluid delivered to the tub 3008, heat the tub 3008, and/or heat air within the tub 3008. The heater 3060 can be placed in the engaged state during the first ozonating phase 3056 and/or immediately following the first ozonating phase 3056. In some examples, the first ozonating phase 3056 can include placing the heater 3060 in the engaged state during at least a portion of the first ozonating phase 3056. For example, the first ozonating phase 3056 can activate the ozone generator 3020 during the machine wash fill 3052 and the ozone generator 3020 can be deactivated simultaneous to the end of the machine wash fill 3052. In such an example, the heater 3060 can be placed in the engaged state once the ozone generator 3020 has been deactivated. Heat from the heater 3060 can encourage decomposition of unreacted ozone that can be present within the tub 3008 and/or the fluid that has been exposed to the ozone produced by the ozone generator 3020.

Figure 4:
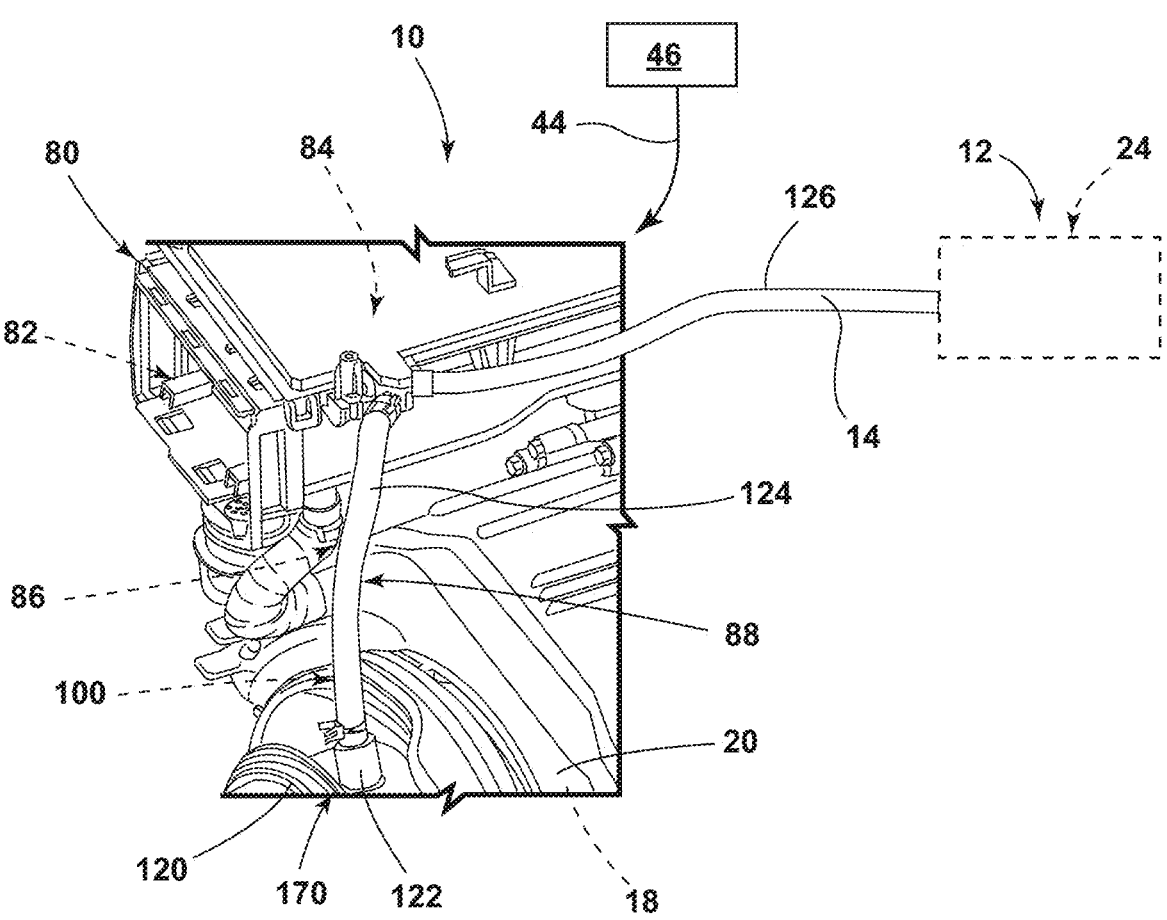
FIG. 4 is a partial perspective view of a dispenser that is incorporated into a sanitization system of an appliance.
Figure 5:
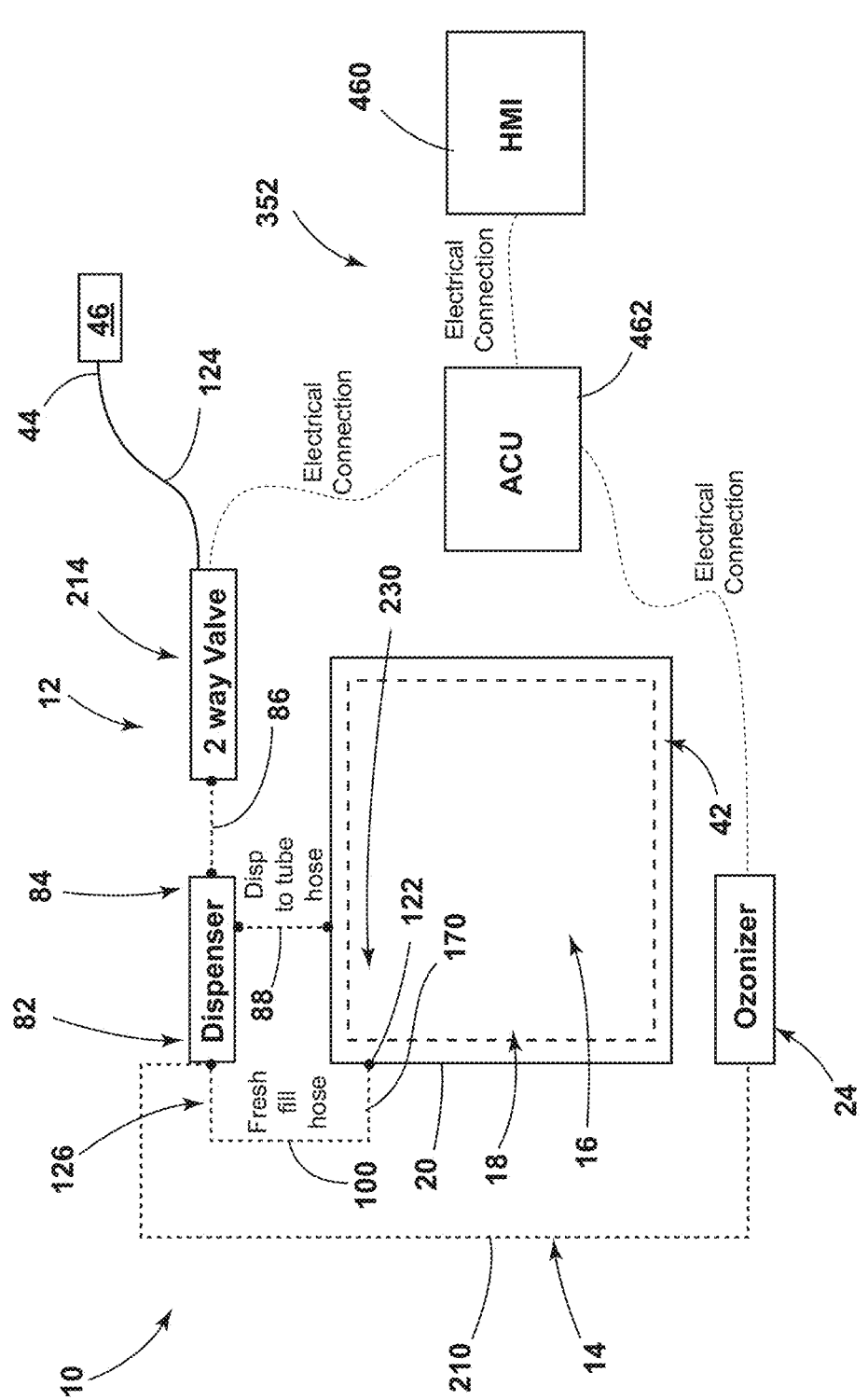
FIG. 5 is a schematic diagram showing operation of a sanitization system of an appliance.
Figure 6:
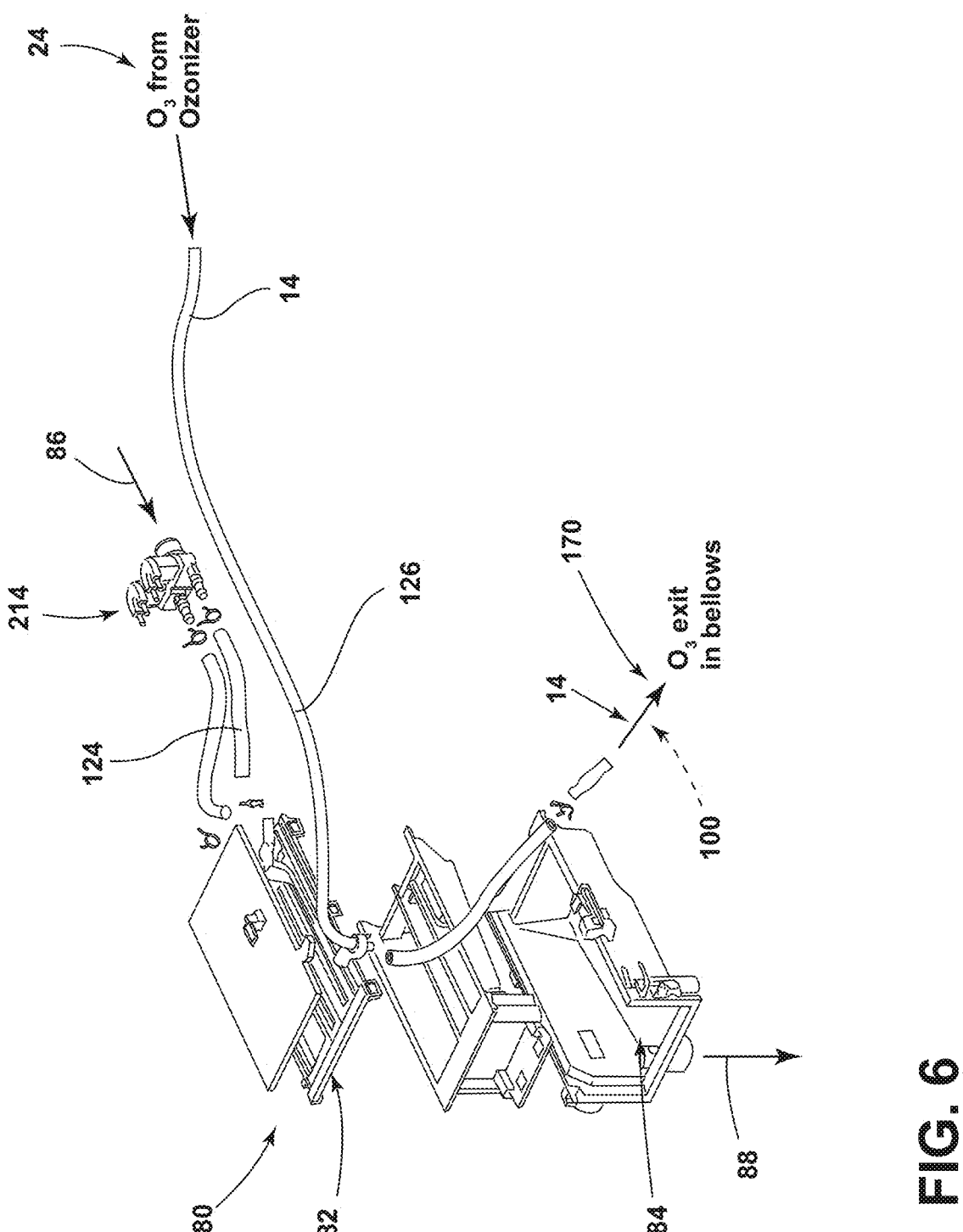
FIG. 6 is an exploded perspective view of a dispenser that is incorporated into a sanitization system of an appliance.
Figure 7:
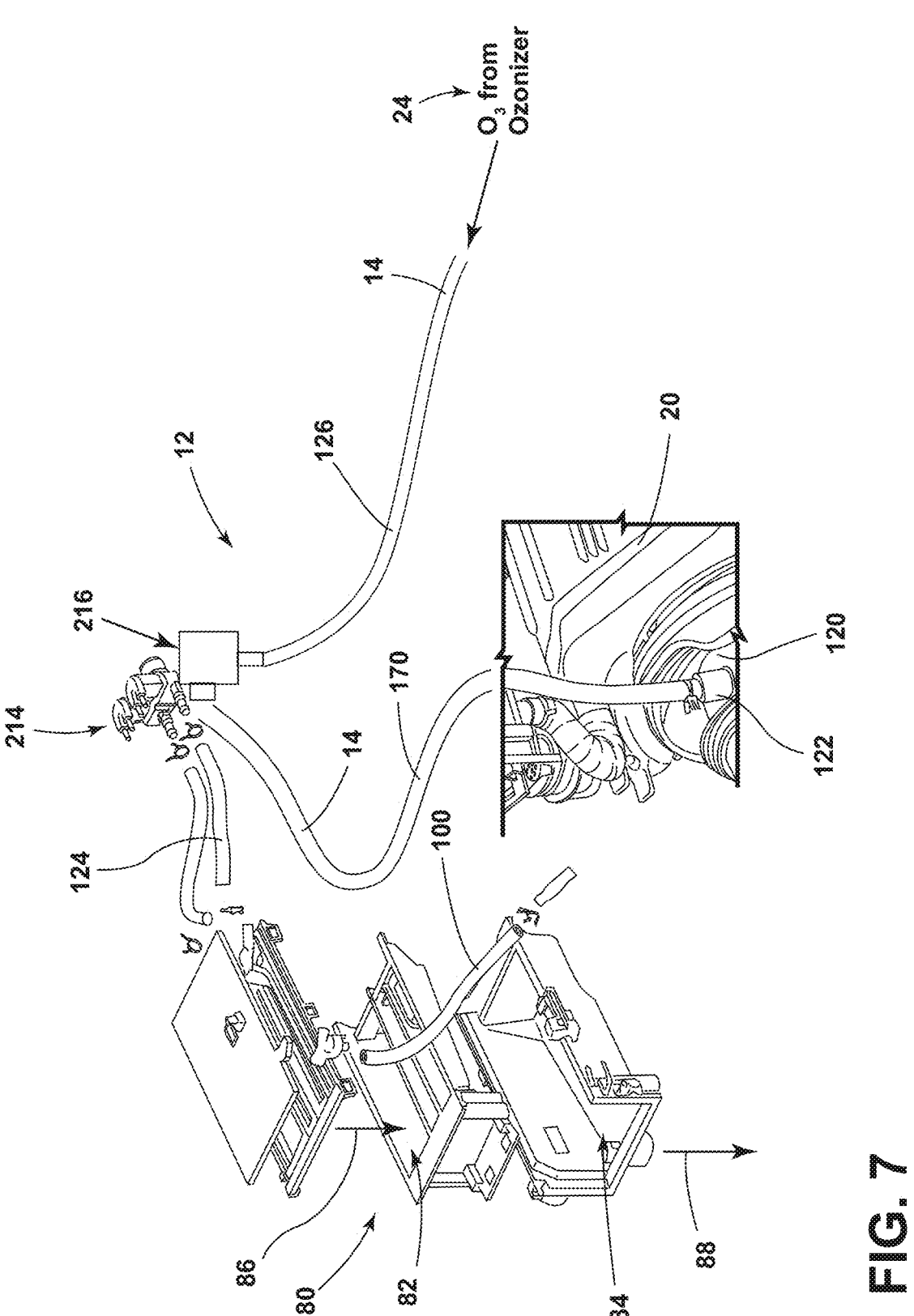
FIG. 7 is an exploded perspective view of a dispenser that is incorporated into a sanitization system of an appliance.
Figure 8:
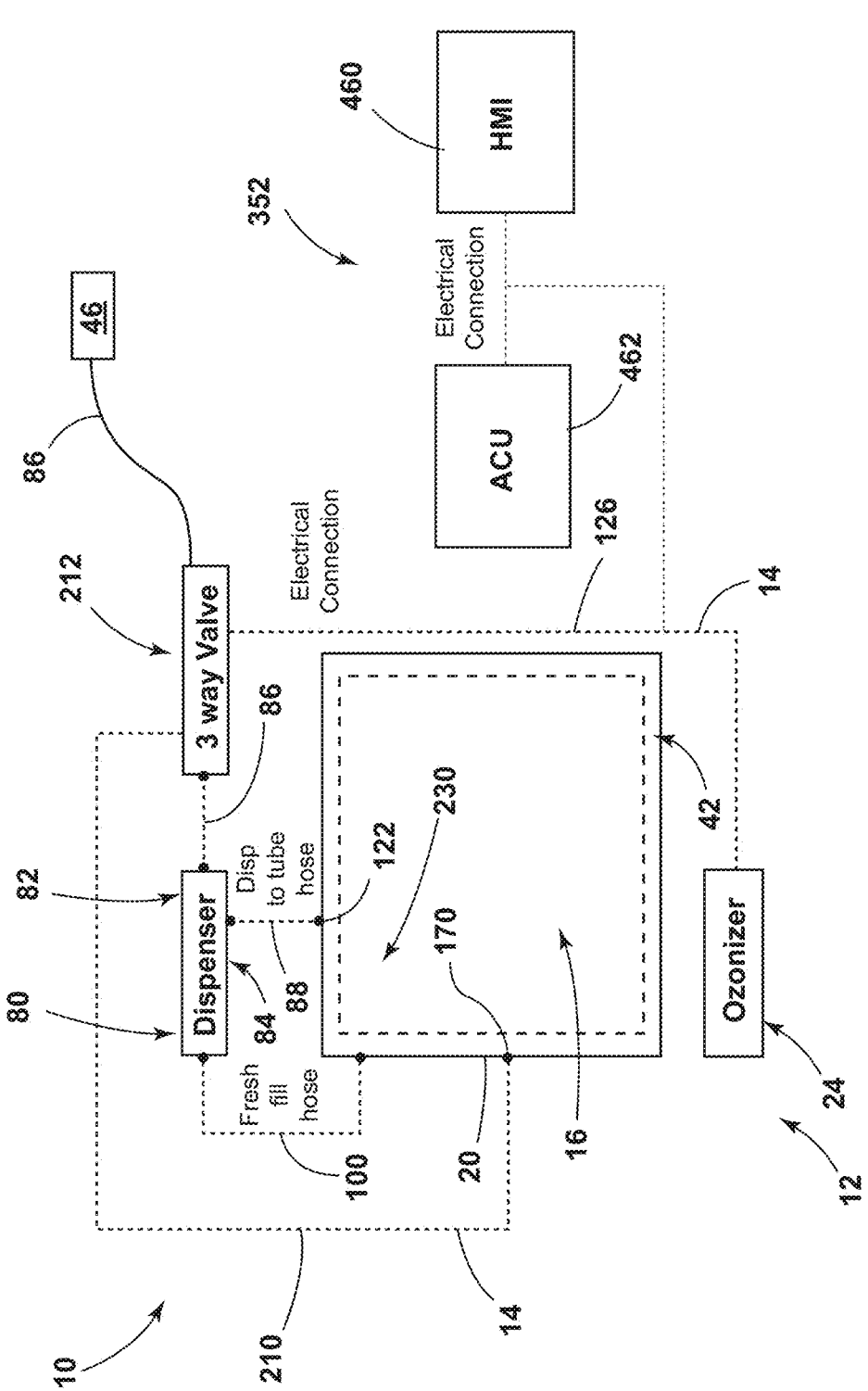
FIG. 8 is a schematic diagram showing operation of a sanitization system of an appliance.

Referring still further to FIGS. 23 and 4, the appliance 3000 includes an agitator 3064. The agitator 3064 is positioned within the tub 3008. The agitator 3064 is operable between an activated state and a deactivated state. When the agitator 3064 is in the activated state, the agitator 3064 may rotate relative to the tub 3008. In some examples, the tub 3008 also serves as the agitator 3064 (e.g., in horizontal axis versions of the appliance 3000). In some examples, movement of the agitator 3064 can be decreased or stopped when the heater 3060 is in the engaged state. In certain aspects of the device, the rotational speed of the agitator 3064 can be decreased after delivery of the wash fluid 292 is completed for a particular laundry cycle 250.

Referring yet again to FIGS. 23 and 24, the first rinse phase 3036 can include a first rinse fill 3068. During the first rinse fill 3068, water is delivered to the tub 3008 for a third period of time. The third period of time can be greater than, equal to, or less than the second period of time. As with the pre-wash fill 3048 and the machine wash fill 3052, the fluid delivered to the tub 3008 during the first rinse fill 3068 can wet the article(s) 22 contained within the tub 3008. In various examples, during at least a portion of the first rinse fill 3068, the ozone generator 3020 is in the activated state such that the fluid delivered to the tub 3008 during the first rinse fill 3068 has been exposed to the ozone produced by the ozone generator 3020. Accordingly, a hardness of the fluid delivered to the tub 3008 may have been decreased as a result of the exposure to the ozone produced by the ozone generator 3020. In some examples, the ozone generator 3020 may be in the activated state for less than an entirety of the first rinse fill 3068. For example, the ozone generator 3020 may be in the deactivated state at a beginning of the first rinse fill 3068 and/or the ozone generator 3020 may be in the deactivated state at an intermediate point in the first rinse fill 3068. In various examples, the ozone generator 3020 may be placed in the activated state during a final portion of the first rinse fill 3068. In some examples, the ozone generator 3020 may remain in the activated state after the first rinse fill 3068 has been completed (e.g., during a spin cycle immediately following thereafter). The first rinse phase 3036 and/or the first rinse fill 3068 can include a second ozonating phase 3072.

Referring again to FIGS. 23 and 24, the heater 3060 can be placed in the engaged state during the second ozonating phase 3072 and/or immediately following the second ozonating phase 3072. In some examples, the second ozonating phase 3072 may include placing the heater 3060 in the engaged state during at least a portion of the second ozonating phase 3072. For example, the second ozonating phase 3072 can activate the ozone generator 3020 during the first rinse fill 3068 and the ozone generator 3020 can be deactivated simultaneous to the end of the first rinse fill 3068. In such an example, the heater 3060 can be placed in the engaged state once the ozone generator 3020 has been deactivated. Heat from the heater 3060 can encourage decomposition of unreacted ozone that can be present within the tub 3008 and/or the water that has been exposed to the ozone produced by the ozone generator 3020.

Referring further to FIGS. 23 and 24, the second rinse phase 3040 can include a second rinse fill 3076. During the second rinse fill 3076, fluid is delivered to the tub 3008 for a fourth period of time. The fourth period of time may be greater than, equal to, or less than the second period of time and/or the third period of time. As with the pre-wash fill 3048, the machine wash fill 3052, and the first rinse fill 3068, the water delivered to the tub 3008 during the second rinse fill 3076 can wet the article(s) 22 contained within the tub 3008. In various examples, during at least a portion of the second rinse fill 3076, the ozone generator 3020 is in the activated state such that the fluid delivered to the tub 3008 during the second rinse fill 3076 has been exposed to the ozone produced by the ozone generator 3020. Accordingly, a hardness of the fluid delivered to the tub 3008 may have been decreased as a result of the exposure to the ozone gas 14 produced by the ozone generator 3020. In some examples, the ozone generator 3020 may be in the activated state for less than an entirety of the second rinse fill 3076. For example, the ozone generator 3020 may be in the deactivated state at a beginning of the second rinse fill 3076 and/or the ozone generator 3020 may be in the deactivated state at an intermediate point in the second rinse fill 3076. In various examples, the ozone generator 3020 may be placed in the activated state during a final portion of the second rinse fill 3076. In some examples, the ozone generator 3020 may remain in the activated state after the second rinse fill 3076 has been completed (e.g., during a spin cycle immediately following thereafter). The second rinse phase 3040 and/or the second rinse fill 3076 can include a third ozonating phase 3080.

Referring again to FIGS. 23 and 24, the heater 3060 can be placed in the engaged state during the third ozonating phase 3080 and/or immediately following the third ozonating phase 3080. In some examples, the third ozonating phase 3080 may include placing the heater 3060 in the engaged state during at least a portion of the third ozonating phase 3080. For example, the third ozonating phase 3080 may activate the ozone generator 3020 during the second rinse fill 3076 and the ozone generator 3020 may be deactivated simultaneous to the end of the second rinse fill 3076. In such an example, the heater 3060 may be placed in the engaged state once the ozone generator 3020 has been deactivated. Heat from the heater 3060 may encourage decomposition of unreacted ozone gas 14 that may be present within the tub 3008 and/or the water that has been exposed to the ozone gas 14 produced by the ozone generator 3020.

Referring still further to FIGS. 23 and 24, in some examples, the heater 3060 may be placed in the engaged state after a final delivery of water to the tub 3008 has been completed. For example, the heater 3060 may be placed in the engaged state following delivery of fluid to the tub 3008 in the second rinse phase 3040 and the heater 3060 may remain in the disengaged state during each of the preceding phases of the washing cycle 3024. In various examples, movement of the agitator 3064 may be decreased, or stopped altogether, after a final delivery of fluid to the tub 3008 has been completed. For example, the agitator 3064 may be placed in the deactivated state following delivery of fluid to the tub 3008 in the second rinse phase 3040. Alternatively, a number of revolutions per minute of the agitator 3064 may be decreased after the final delivery of fluid to the tub 3008 has been completed.

Referring yet again to FIGS. 23 and 24, the introduction of ozone gas 14 into the fluid can aid in softening a water of the fluid (i.e., decrease hardness) for the washing cycle 3024. Without being bound by theory, the introduction of ozone gas 14 into the fluid can result in oxidation of dissolved metals and/or dissolved minerals. Such oxidation of the dissolved metals and/or the dissolved minerals can cause the dissolved metals and/or the dissolved minerals to precipitate. The precipitated components (e.g., metals and/or minerals) can then settle to the bottom of the tub 3008 and ultimately increase the ability of the fluid to remove or solubilize additional material. For example, the precipitation of the dissolved metals and/or the dissolved minerals can enable a greater concentration of cleaning chemistry 82 to be dissolved in the fluid, enable greater foaming for detergents, and/or enable the removal of a greater number of soils for the article(s) 22 contained in the tub 3008 during the washing cycle 3024. The ozone gas 14 can be delivered to the fluid at an output concentration of up to about 10 ppm. For example, the concentration of ozone gas 14 within the fluid can be about 1.0 ppm, about 2.0 ppm, about 3.0 ppm, about 4.0 ppm, about 5.0 ppm, about 6.0 ppm, about 7.0 ppm, about 8.0 ppm, about 9.0 ppm, about 10 ppm, and/or combinations or ranges thereof. The concentration output by the ozone generator 3020 can be greater than the concentration of the ozone gas 14 present within the fluid in an effort to account for ozone gas 14 reacting with water and non-water components of the fluid, account for ozone gas 14 reacting with components of the appliance 3000, and/or account for decomposition of ozone gas 14 on the way to the tub 3008. Accordingly, the concentration of ozone gas 14 present along a flow path of the fluid and/or at various locations within the appliance 3000 can vary.

According to another aspect of the present disclosure, an appliance 3000 includes a housing 3004, a tub 3008 positioned within the housing 3004, a fluid inlet 3012 that receives fluid from a source 3016, and an ozone generator 3020. The ozone generator 3020 is operable between an activated state and a deactivated state. The ozone generator 3020 produces ozone gas 14 when in the activated state. The fluid received at the fluid inlet 3012 is exposed to the ozone gas 14 produced by the ozone generator 3020. A hardness of the fluid, typically a water component of the fluid, is decreased as a result of exposure to the ozone gas 14 produced by the ozone generator 3020.

According to another aspect, fluid is delivered to a tub 3008 after the fluid has been exposed to ozone gas 14 produced by an ozone generator 3020.

According to another aspect, fluid is delivered to a tub 3008 during a washing cycle 3024 of an appliance 3000.

According to another aspect, fluid is delivered to a tub 3008 during a rinse cycle of an appliance 3000.

According to another aspect, an appliance 3000 includes a heater 3060. The heater 3060 is activated after a final delivery of fluid to a tub 3008 has been completed.

According to another aspect, heat generated by a heater 3060 increases a temperature within a tub 3008.

According to another aspect, an appliance 3000 includes an agitator 3064. The agitator 3064 is positioned within a tub 3008.

According to another aspect, movement of an agitator 3064 is decreased after a final delivery of fluid to a tub 3008 has been completed.

According to another aspect, an appliance 3000 includes a tub 3008. The tub 3008 is configured to rotate relative to a housing 3004.

According to another aspect, ozone gas 14 is delivered to fluid at an output concentration of up to about 10 ppm.

According to another aspect, a flow rate of fluid is in a range of about 1 liter per minute to about 3 liters per minute.

Figure 25:
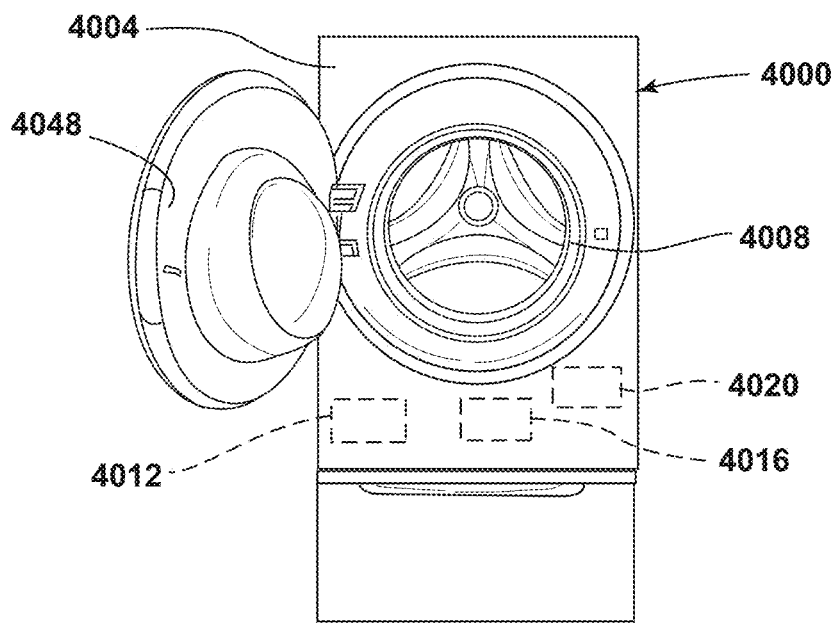
FIG. 25 is a front view of an appliance, illustrating various components thereof, according to one aspect.

Referring to FIG. 25, reference numeral 4000 generally designates an appliance. In various examples, the appliance 4000 can be a laundering appliance. For example, the appliance 4000 may be a clothes laundering appliance (e.g., a clothes washer, a clothes dryer, or a combination washer/dryer). Alternatively, the appliance 4000 may be a kitchenware laundering appliance (e.g., a dishwasher). The appliance 4000 includes a housing 4004. A drum 4008 is positioned within the housing 4004. The drum 4008 is configured to rotate relative to the housing 4004. In various examples, the drum 4008 may be oriented within the housing 4004 such that a rotation axis of the drum 4008 is non-vertical (e.g., horizontal or primarily extending along a horizontal axis). The appliance 4000 also includes an ozone generator 4012, a blower fan 4016, and a heater 4020. The ozone generator 4012 is operable between an activated state and a deactivated state. When the ozone generator 4012 is in the activated state, the ozone generator 4012 produces ozone gas 14. The blower fan 4016 and the heater 4020 are each operable between an activated state and a deactivated state.

Figure 26:
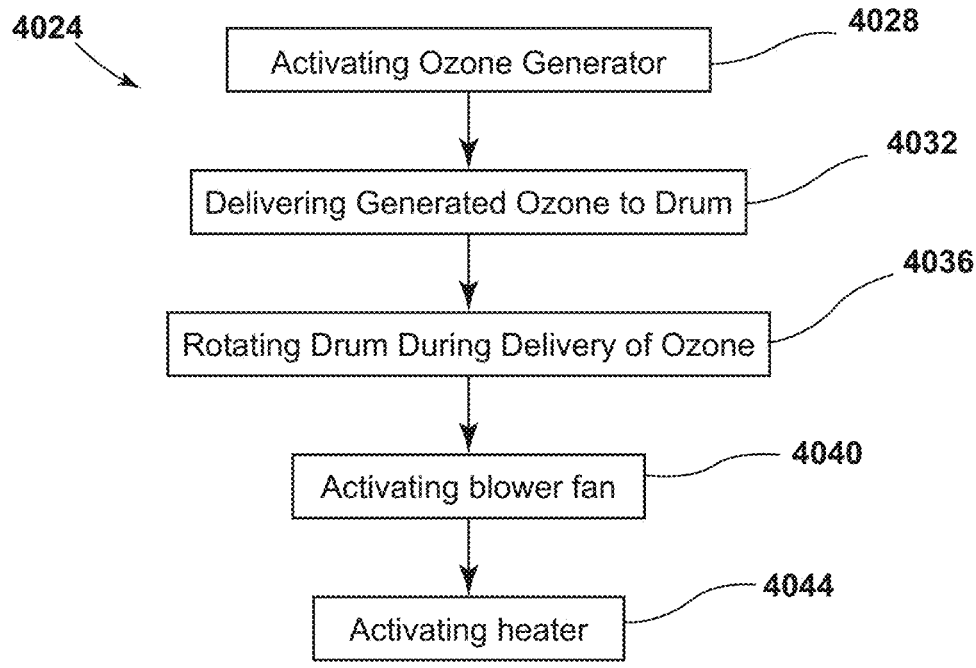
FIG. 26 is a flow diagram illustrating a method of drying articles within the appliance, according to one aspect.

Referring now to FIGS. 25 and 26, a method 4024 of drying articles 22 (e.g., clothing or kitchenware) within the appliance 4000 includes step 4028 of activating the ozone generator 4012. The method 4024 also includes step 4032 of delivering ozone gas 14 produced by the ozone generator 4012 to the drum 4008 of the appliance 4000 during a drying cycle. The method 4024 further includes step 4036 of rotating the drum 4008 during the delivery of the ozone gas 14. Additionally, the method 4024 includes step 4040 of activating the blower fan 4016 during the delivery of the ozone gas 14. Further, the method 4024 includes step 4044 of activating the heater 4020. The ozone gas 14 is delivered to the drum 4008 for several minutes. After the ozone gas 14 has been delivered to the drum 4008 for several minutes, the ozone generator 4012 is deactivated.

Referring again to FIGS. 25 and 26, the method 4024 of drying articles 22 within the appliance 4000 can be carried out in a combination washer/dryer appliance. In such an example, the article(s) 22 contained within the drum 4008 can undergo a washing cycle. Once the washing cycle has been completed, the combination washer/dryer appliance typically initiates a drying cycle to remove moisture from the article(s) 22 that underwent the washing cycle. With the present disclosure, ozone gas 14 that is produced by the ozone generator 4012 can be introduced into the drum 4008 following the washing cycle and prior to initiation of the drying cycle. The introduction of the ozone gas 14 into the drum 4008 can be referred to as an ozonating phase (e.g., a first ozonating phase 3056). In various examples, the drum 4008 can be driven to rotate (e.g., by a motor 256) during the first ozonating phase 3056. In so doing, the article(s) 22 contained within the drum 4008 can be gently tumbled, thereby adjusting a position of the article(s) 22 such that additional surface area of the article(s) 22 can be exposed to the ozone gas 14. The blower fan 4016 is activated during the first ozonating phase 3056. The fluid movement (e.g., air movement) induced by rotation of the blower fan 4016 can carry the ozone gas 14 from the ozone generator 4012 to the drum 4008 by way of suitably configured ductwork.

Referring further to FIGS. 25 and 26, the ozone gas 14 produced by the ozone generator 4012 can be delivered to the drum 4008 for several minutes. For example, the ozone gas 14 produced by the ozone generator 4012 can be delivered to the drum 4008 for about two minutes, about three minutes, about four minutes, about five minutes, about six minutes, about seven minutes, about eight minutes, about nine minutes, about ten minutes, or more. Once a desired amount of time for ozone gas 14 delivery to the drum 4008 has elapsed, the heater 4020 can be activated. For example, once the desired amount of time for ozone gas 14 delivery to the drum 4008 has elapsed, the ozone generator 4012 can be placed in the deactivated state such that ozone gas 14 is no longer being actively produced by the ozone generator 4012. In various examples, once the ozone generator 4012 has been placed in the deactivated state, the heater 4020 can be activated such that the heater 4020 begins to produce heat. The heat produced by the heater 4020 is delivered to the drum 4008 (e.g., by ductwork). In some examples, the blower fan 4016 is in fluid communication with the ductwork associated with the ozone generator 4012 and the ductwork associated with the heater 4020. Accordingly, a single blower fan 4016 can be employed in the appliance 4000 to induce air movement for the ozone generator 4012 and the heater 4020. In alternative examples, the ductwork associated with the ozone generator 4012 and the ductwork associated with the heater 4020 may each have one of the blower fans 4016 associated therewith. Regardless of the particular arrangement, the blower fan 4016 can be activated to induce air movement past the heater 4020, thereby causing a temperature of the air being moved to increase. The air that has been exposed to the heater 4020 is then delivered to the drum 4008.

Referring still further to FIGS. 25 and 26, the heater 4020 may be positioned upstream of the ozone generator 4012 and the drum 4008 is positioned downstream of the ozone generator 4012. Accordingly, the heated air 272 can deliver to the drum 4008, or thermally decompose, any residual ozone gas 14 that remains after completion of the first ozonating phase 3056. The heated air 272 can serve at least two purposes. First, the heated air 272 can act as a drying agent for the article(s) 22 within the drum 4008 that have undergone a washing cycle. The washing cycle may have taken place within the appliance 4000 or within a separate appliance. Second, the heated air 272 can serve to accelerate decomposition, or neutralization, of residual ozone gas 14 that may be present within the appliance 4000 from the first ozonating phase 3056. The period of time where the heated air 272 is delivered to the drum 4008 can define at least a portion of a drying cycle. A thermometer can be coupled to the drum 4008 such that the appliance 4000 can monitor a temperature within the drum 4008. In various examples, once the drying cycle has been completed and the temperature has fallen below a first predetermined threshold, the ozone generator 4012 can be activated again to initiate a second ozonating phase 3072. The first predetermined threshold can be a temperature at which a half-life of ozone gas 14 is at least several minutes. For example, the first predetermined threshold can be about 200° C., about 175° C., about 150° C., about 125° C., about 100° C., about 75° C., or about 50° C.

Referring yet again to FIGS. 25 and 26, the second ozonating phase 3072 can be employed as a final cleansing phase for the article(s) 22 contained within the drum 4008. During the second ozonating phase 3072, the blower fan 4016 is activated to facilitate efficient delivery of the ozone gas 14 to the drum 4008. In some examples, during the second ozonating phase 3072, the drum 4008 can be driven to rotate to gently tumble the article(s) 22 within the drum 4008, thereby adjusting a position of the article(s) 22 such that additional surface area of the article(s) 22 can be exposed to the ozone gas 14. The second ozonating phase 3072 can occur during a cool down phase of a drying cycle (e.g., method 4024) of the appliance 4000. The cool down phase can be a period of time toward the end of the drying cycle where the heater 4020 has been transitioned from the activated state to the deactivated state. In various examples, the ozone generator 4012 can remain active after the cool down phase of the drying cycle has been completed. In other words, the second ozonating phase 3072 can extend beyond a termination of the cool down phase. In some examples, rotation of the drum 4008 can cease at the termination of the cool down phase. Termination of the cool down phase can be marked by the temperature within the drum 4008 falling below a second predetermined threshold. For example, the second predetermined threshold can be about 35° C., about 30° C., about 25° C., about 20° C., about 15° C., or about 10° C. In various examples, an access door 4048 of the appliance 4000 can be prevented from opening (e.g., by a lock assembly) during the first ozonating phase 3056 and/or the second ozonating phase 3072.

The preceding description can apply equally to any appliance that utilizes a drying cycle. For example, and without limitation, the preceding description can be employed with a clothes dryer, a combination clothes washer/dryer, and/or a dishwasher.

According to another aspect of the present disclosure, a method 4024 of drying articles 22 (e.g., clothing or kitchenware) within an appliance 4000 includes step 4028 of activating an ozone generator 4012. The method 4024 also includes step 4032 of delivering ozone gas 14 produced by the ozone generator 4012 to a drum 4008 of the appliance 4000 during a drying cycle. The method 4024 further includes step 4036 of rotating the drum 4008 during the delivery of the ozone gas 14. Additionally, the method 4024 includes step 4040 of activating a blower fan 4016 during the delivery of the ozone gas 14. Further, the method 4024 includes step 4044 of activating a heater 4020. The ozone gas 14 is delivered to the drum 4008 for several minutes. After the ozone gas 14 has been delivered to the drum 4008 for several minutes, the ozone generator 4012 is deactivated.

According to another aspect, a heater 4020 is activated after an ozone generator 4012 has been deactivated.

According to another aspect, a method 4024 of drying articles 22 within an appliance 4000 can include reactivating an ozone generator 4012 after a heater 4020 is deactivated. The ozone generator 4012 can be reactivated once a temperature within a drum 4008 is below a predetermined threshold.

According to another aspect, an ozone generator 4012 remains active after a cool down phase of a drying cycle has been completed.

The invention disclosed herein is further summarized in the following paragraphs and is further characterized by combinations of any and all of the various aspects described therein.

According to one aspect of the present disclosure, a laundry washing appliance includes a drum that is rotationally operable within a tub. A sanitization mechanism delivers ozone into a processing space defined within the drum for sanitizing laundry within the drum. An ozone generator of the sanitization mechanism generates ozone gas. A fluid pump includes an impeller that rotates within a volute for delivering wash fluid to the processing space. A nozzle is coupled with the volute and the ozone generator that injects ozone gas onto the volute to be mixed with the wash fluid that is agitated to a turbulent state in the volute.

According to another aspect, the ozone gas injected into the volute uses a one-way vale. The impeller of the volute agitates the wash fluid to produce a plurality of microbubbles in the turbulent state. The one-way valve injects the ozone within the plurality of microbubbles within the volute.

According to another aspect, the fluid pump is a recirculation pump that recirculates the wash fluid between the drum and the volute.

According to another aspect of the present disclosure, a laundry washing appliance includes a drum that is rotationally operable within a tub. A sanitization mechanism delivers ozone into a processing space defined within the drum for sanitizing laundry within the drum. An ozone generator of the sanitization mechanism generates ozone gas wherein the sanitization mechanism includes an injection device that injects the ozone, in the form of the ozone gas, into the drum during a specific rotational operation of the drum.

According to another aspect, the ozone gas injected into the drum during a dedicated ozone operations utilizes a fast-tumble rotation of the drum that is only used during a sanitization cycle of the laundry appliance.

According to another aspect, the injection device of the ozone occurs through operation of a dedicated fresh-air recovery fan. The ozone is injected into a stream of recovery air for dispersion during a sanitization cycle.

According to another aspect, a concentration of the ozone gas adjusts depending on characteristics of a sanitization cycle including sub cycles performed during the sanitization cycle.

According to another aspect, a user selects the concentration of the ozone gas through a user interface that allows the user to select a desired sub cycle of the sub cycles to be performed during a laundry cycle.

According to another aspect, the sub cycles of the sanitization cycle include an odor elimination cycle, a bacterial elimination cycle, and a virus elimination cycle.

According to another aspect, the sanitization cycle includes a universal sanitizing cycle that includes all of the sub cycles being operated in a predetermined succession. The universal sanitizing cycle includes a high-heat cycle that is initiated after the sub cycles to decompose the ozone remaining within the drum.

According to another aspect, a sanitization cycle includes an odor elimination and a fragrance cycle that utilizes sprayed scent that is combined with the ozone to eliminate undesirable odors and add selected odors.

According to another aspect, the ozone generator selectively injects the ozone into a mixing chamber. A carrier fluid and a cleaning chemistry are disposed into the mixing chamber and subsequently mixed with the ozone gas to form an ozone-containing fluid that is dispensed into the drum to interact with articles being processed.

According to another aspect, the ozone generator selectively injects the ozone into fluid within a sump defined by the tub surrounding the drum to form an ozone-containing fluid. The ozone-containing fluid is directed by a recirculation system from the sump onto articles being processed within the drum and back to the sump for continued recirculation.

According to another aspect, the laundry washing appliance further includes a dispenser with a fill port in fluid communication with a carrier fluid supply hose and the ozone generator. A valve is opened when the ozone generator is activated to allow the ozone gas to flow through the fill port into a tube that extends into the drum to expose articles being processed in the drum to the ozone gas.

According to another aspect, the laundry washing appliance further includes a disposer that has a three-way valve that controls a carrier fluid being supplied from a supply hose, a cleaning chemistry dispensing from the dispenser, and the ozone gas being supplied by the ozone generator. A valve for the ozone generator is activated to allow the ozone gas to enter the drum through a tube that extends into the drum via a bellows.

According to yet another aspect of the present disclosure, an appliance includes a housing, a tub that is positioned within the housing, a fluid inlet that receives water from a water source, and an ozone generator. The ozone generator is operable between an activated state and a deactivated state. The ozone generator produces ozone when in the activated state. The water received at the fluid inlet is exposed to the ozone produced by the ozone generator. A hardness of the water is decreased as a result of exposure to the ozone produced by the ozone generator.

According to another aspect, the appliance further includes a heater. The heater is activated after a final delivery of the water to the tub has been completed.

According to another aspect, the appliance further includes an agitator. The agitator is positioned within the tub, and a rotational speed of the agitator is decreased after a final delivery of the water to the tub has been completed.

According to another aspect, the ozone is delivered to the water at an output concentration of up to about 10 ppm.

According to another aspect, a flow rate of the water is in a range of about 1 liter per minute to about 3 liters per minutes.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A laundry washing appliance comprising:
a drum that is rotationally operable within a tub;
a sanitization mechanism for delivering ozone into a processing space defined within the drum for sanitizing laundry within the drum;
an ozone generator of the sanitization mechanism that generates ozone gas wherein the sanitization mechanism includes an ozone injector that injects the ozone, in a form of the ozone gas, into the drum during a specific rotational operation of the drum; and
a dispenser with a fill port in fluid communication with a carrier fluid supply hose and the ozone generator, wherein a one-way valve is opened when the ozone generator is activated to allow the ozone gas to flow through the fill port, into a tube that extends into the drum to expose articles being processed in the drum to the ozone gas.

2. The laundry washing appliance of claim 1, wherein the ozone gas is injected into the drum during a dedicated ozone operation that utilizes a fast-tumble rotation of the drum that is only used during a sanitization cycle of the laundry appliance.

3. The laundry washing appliance of claim 1, wherein the injection of the ozone also occurs through operation of a dedicated fresh-air recovery fan, and wherein the ozone is further injected into a stream of recovery air for dispersion during a sanitization cycle.

4. The laundry washing appliance of claim 1, wherein a concentration of the ozone gas is adjustable depending on characteristics of a sanitization cycle including sub cycles that are performed during the sanitization cycle.

5. The laundry washing appliance of claim 4, wherein a user selects the concentration of the ozone gas through a user interface that allows the user to select a desired sub cycle of the sub cycles to be performed during a laundry cycle.

6. The laundry washing appliance of claim 5, wherein the sub cycles of the sanitization cycle include an odor elimination cycle, a bacterial elimination cycle and a virus elimination cycle.

7. The laundry washing appliance of claim 6, wherein the sanitization cycle includes a universal sanitization cycle that includes all of the sub cycles being operated in a predetermined succession, and wherein the universal sanitization cycle includes a high-heat cycle that is initiated after the sub cycles to decompose the ozone remaining within the drum.

8. The laundry washing appliance of claim 1, wherein a sanitization cycle includes an odor elimination and a fragrance cycle that utilizes sprayed scent that is combined with the ozone to eliminate undesirable odors and add selected odors.

9. The laundry washing appliance of claim 1, wherein the ozone generator selectively injects the ozone into a mixing chamber, wherein a carrier fluid and a cleaning chemistry are disposed into the mixing chamber and subsequently mixed with the ozone gas to form an ozone-containing fluid that is dispensed into the drum to interact with articles being processed.

10. The laundry washing appliance of claim 1, wherein the dispenser includes a three-way valve that controls a carrier fluid being supplied from the carrier fluid supply hose, a cleaning chemistry dispensing from the dispenser, and the ozone gas being supplied by the ozone generator, wherein the one-way valve for the ozone generator is activated to allow the ozone gas to enter the drum through a tube that extends into the drum.

11. A laundry washing appliance comprising:

a drum that is rotationally operable within a tub;

a sanitization mechanism for delivering ozone into a processing space defined within the drum for sanitizing laundry within the drum;

an ozone generator of the sanitization mechanism that generates ozone gas wherein the sanitization mechanism includes an ozone injector that injects the ozone, in a form of the ozone gas, into the drum during a specific rotational operation of the drum; and a dispenser having a three-way valve that controls a carrier fluid being supplied from a carrier fluid supply hose, a cleaning chemistry dispensing from the dispenser, and the ozone gas being supplied by the ozone generator, wherein a one-way valve for the ozone generator is activated to allow the ozone gas to enter the drum through a tube that extends into the drum via a bellows.

12. The laundry washing appliance of claim 11, wherein the ozone gas is injected into the drum during a dedicated ozone operation that utilizes a fast-tumble rotation of the drum that is only used during a sanitization cycle of the laundry appliance.

13. The laundry washing appliance of claim 11, wherein the injection of the ozone also occurs through operation of a dedicated fresh-air recovery fan, and wherein the ozone is further injected into a stream of recovery air for dispersion during a sanitization cycle.

14. The laundry washing appliance of claim 11, wherein a concentration of the ozone gas is adjustable depending on characteristics of a sanitization cycle including sub cycles that are performed during the sanitization cycle.

15. The laundry washing appliance of claim 14, wherein a user selects the concentration of the ozone gas through a user interface that allows the user to select a desired sub cycle of the sub cycles to be performed during a laundry cycle.

16. The laundry washing appliance of claim 15, wherein the sub cycles of the sanitization cycle include an odor elimination cycle, a bacterial elimination cycle and a virus elimination cycle.

17. The laundry washing appliance of claim 16, wherein the sanitization cycle includes a universal sanitization cycle that includes all of the sub cycles being operated in a predetermined succession, and wherein the universal sanitization cycle includes a high-heat cycle that is initiated after the sub cycles to decompose the ozone remaining within the drum.

18. The laundry washing appliance of claim 11, wherein a sanitization cycle includes an odor elimination and a fragrance cycle that utilizes sprayed scent that is combined with the ozone to eliminate undesirable odors and add selected odors.

19. The laundry washing appliance of claim 11, wherein the ozone generator selectively injects the ozone into a mixing chamber, wherein a carrier fluid and a cleaning chemistry are disposed into the mixing chamber and subsequently mixed with the ozone gas to form an ozone-containing fluid that is dispensed into the drum to interact with articles being processed.

20. The laundry washing appliance of claim 11, wherein the dispenser includes a fill port in fluid communication with the carrier fluid supply hose and the ozone generator, wherein the one-way valve is opened when the ozone generator is activated to allow the ozone gas to flow through the fill port, into a tube that extends into the drum to expose articles being processed in the drum to the ozone gas.

* * * * *